United States Patent
Miller et al.

(10) Patent No.: US 10,560,418 B2
(45) Date of Patent: Feb. 11, 2020

(54) TECHNIQUES FOR MANAGING DISCUSSION SHARING ON A MOBILE PLATFORM

(71) Applicant: Facebook, Inc., Menlo Park, CA (US)

(72) Inventors: Joshua Alexander Miller, Menlo Park, CA (US); Julius Yu Tarng, New York, NY (US); Cemre Gungor, Brooklyn, NY (US)

(73) Assignee: FACEBOOK, INC., Menlo Park, CA (US)

( * ) Notice: Subject to any disclaimer, the term of this patent is extended or adjusted under 35 U.S.C. 154(b) by 1079 days.

(21) Appl. No.: 14/505,032

(22) Filed: Oct. 2, 2014

(65) Prior Publication Data
US 2016/0098616 A1    Apr. 7, 2016

(51) Int. Cl.
*H04L 12/58*    (2006.01)

(52) U.S. Cl.
CPC ............. *H04L 51/32* (2013.01); *H04L 51/18* (2013.01)

(58) Field of Classification Search
CPC ....................................... H04L 51/32
USPC ......................................... 709/204
See application file for complete search history.

(56) References Cited

U.S. PATENT DOCUMENTS

| | | | | |
|---|---|---|---|---|
| 5,721,781 A * | 2/1998 | Deo | ..................... | G06Q 20/341 705/67 |
| 5,770,846 A * | 6/1998 | Mos | ..................... | G06K 7/084 235/440 |
| 7,334,259 B2 * | 2/2008 | Haala | ..................... | G06Q 20/341 382/115 |
| 7,356,679 B1 * | 4/2008 | Le | ..................... | G06F 17/30067 707/E17.01 |
| 7,530,101 B2 * | 5/2009 | Gallo | ..................... | G06Q 20/341 709/225 |
| 7,565,517 B1 * | 7/2009 | Arbon | ..................... | G06F 8/63 709/220 |
| 7,917,912 B2 * | 3/2011 | Gershinsky | ..................... | H04L 67/327 709/204 |
| 7,970,883 B2 * | 6/2011 | Yoshikai | ..................... | G06Q 10/10 709/203 |
| 8,862,709 B2 * | 10/2014 | Cromer | ..................... | G06F 9/4416 709/222 |
| 9,307,034 B1 * | 4/2016 | Keyani | ..................... | H04W 4/21 |
| 9,495,661 B2 * | 11/2016 | Zhuang | ..................... | H04L 12/1822 |
| 9,641,713 B2 * | 5/2017 | Ohshima | ..................... | H04N 1/00891 |
| 9,774,689 B2 * | 9/2017 | Barton | ..................... | H04L 67/325 |

(Continued)

FOREIGN PATENT DOCUMENTS

WO    WO 2013051916 A1 *    4/2013    ........... H04L 9/3215

OTHER PUBLICATIONS

Merriam-Webster, "discussion", 2018.*

(Continued)

*Primary Examiner* — Ondrej C Vostal

(57) ABSTRACT

Techniques for managing discussion sharing on a mobile platform, comprising a mobile discussions application. The mobile discussions application may include, among other components, a discussions imaging component for recognizing a ticket associated with a resource in a social networking system and a discussions management component for enabling a user having an associated user profile information to access the resource based at least partially on the ticket associated with the resource.

15 Claims, 13 Drawing Sheets

(56) References Cited

U.S. PATENT DOCUMENTS

| | | | |
|---|---|---|---|
| 2002/0013815 A1* | 1/2002 | Obradovich | H04L 29/12122 709/204 |
| 2002/0051181 A1* | 5/2002 | Nishimura | H04L 51/066 358/1.15 |
| 2002/0186257 A1* | 12/2002 | Cadiz | G06F 17/30867 715/838 |
| 2004/0003352 A1* | 1/2004 | Bargeron | G06F 17/24 715/230 |
| 2004/0024851 A1* | 2/2004 | Naidoo | G08B 13/19669 709/219 |
| 2004/0267938 A1* | 12/2004 | Shoroff | H04L 12/1813 709/227 |
| 2005/0144493 A1* | 6/2005 | Cromer | G06F 9/4416 713/310 |
| 2005/0154925 A1* | 7/2005 | Chitrapu | H04W 12/04 726/19 |
| 2005/0225794 A1* | 10/2005 | Ono | H04L 29/1232 358/1.15 |
| 2005/0273844 A1* | 12/2005 | Dapkus | H04L 63/0823 726/9 |
| 2006/0031353 A1* | 2/2006 | Patrick | H04L 51/14 709/206 |
| 2006/0208066 A1* | 9/2006 | Finn | G06K 7/0004 235/380 |
| 2006/0218208 A1* | 9/2006 | Nagami | G06F 17/30864 |
| 2007/0292006 A1* | 12/2007 | Johnson | G06K 9/00006 382/124 |
| 2008/0091617 A1* | 4/2008 | Hazel | G06Q 20/085 705/73 |
| 2008/0208963 A1* | 8/2008 | Eyal | G06Q 10/10 709/203 |
| 2008/0209218 A1* | 8/2008 | Rowley | H04L 9/3247 713/176 |
| 2009/0049070 A1* | 2/2009 | Steinberg | G06F 17/3089 |
| 2010/0005268 A1* | 1/2010 | Yang | H04L 12/1831 711/202 |
| 2011/0208418 A1* | 8/2011 | Looney | G06Q 20/10 701/532 |
| 2012/0150972 A1* | 6/2012 | Morris | G06Q 50/00 709/206 |
| 2012/0167186 A1* | 6/2012 | Dietrich | G06F 21/34 726/6 |
| 2012/0284335 A1* | 11/2012 | Chung | H04L 63/0414 709/204 |
| 2012/0317631 A1* | 12/2012 | Assam | H04L 63/08 726/7 |
| 2012/0331067 A1* | 12/2012 | Richter | G06Q 10/107 709/206 |
| 2013/0018963 A1* | 1/2013 | Brauff | G06Q 10/107 709/206 |
| 2013/0103624 A1* | 4/2013 | Thieberger | G06Q 10/063 706/12 |
| 2013/0159743 A1* | 6/2013 | Inoue | H04N 1/00896 713/320 |
| 2013/0179953 A1* | 7/2013 | Kritt | G06Q 50/01 726/7 |
| 2013/0191286 A1* | 7/2013 | Cronic | G06Q 20/3821 705/44 |
| 2013/0198004 A1* | 8/2013 | Bradley | G06Q 30/0267 705/14.64 |
| 2013/0208893 A1* | 8/2013 | Shablygin | H04L 9/0822 380/277 |
| 2013/0251216 A1* | 9/2013 | Smowton | H04L 9/3231 382/118 |
| 2013/0268687 A1* | 10/2013 | Schrecker | H04W 12/06 709/229 |
| 2013/0268767 A1* | 10/2013 | Schrecker | G06F 21/31 713/185 |
| 2014/0041055 A1* | 2/2014 | Shaffer | G06Q 10/10 726/28 |
| 2014/0108562 A1* | 4/2014 | Panzer | G06Q 10/10 709/206 |
| 2014/0150072 A1* | 5/2014 | Castro | G06F 21/40 726/5 |
| 2014/0165155 A1* | 6/2014 | Zhang | H04L 63/08 726/4 |
| 2014/0310349 A1* | 10/2014 | Rainisto | H04W 4/21 709/204 |
| 2014/0333412 A1* | 11/2014 | Lewis | G07C 9/00031 340/5.2 |
| 2014/0344350 A1* | 11/2014 | Sinn | H04L 65/403 709/204 |
| 2014/0359299 A1* | 12/2014 | Jaundalders | H04L 9/3215 713/179 |
| 2015/0074194 A1* | 3/2015 | Schabes | H04L 51/32 709/204 |
| 2015/0302086 A1* | 10/2015 | Roberts | G06F 17/30743 707/771 |
| 2015/0304369 A1* | 10/2015 | Sandholm | G06Q 10/10 715/753 |
| 2015/0381545 A1* | 12/2015 | Brunn | H04L 47/808 709/206 |
| 2016/0021152 A1* | 1/2016 | Maguire | G06F 16/5866 709/204 |
| 2016/0080510 A1* | 3/2016 | Dawoud Shenouda Dawoud | H04L 47/808 709/225 |
| 2016/0087957 A1* | 3/2016 | Shah | H04L 63/205 726/1 |
| 2016/0094528 A1* | 3/2016 | Gordon | H04L 63/08 726/7 |
| 2016/0127341 A1* | 5/2016 | Yan | H04L 63/0407 726/9 |
| 2016/0205358 A1* | 7/2016 | Dickinson | H04N 7/181 348/157 |
| 2016/0253710 A1* | 9/2016 | Publicover | G06Q 30/02 705/14.66 |

OTHER PUBLICATIONS

Fielding et al., "Hypertext Transfer Protocol—HTTP/1.1", RFC 2616, 1999 (Year: 1999).*
Hammer-Lahav, "The OAuth 1.0 Protocol", RFC 5849, 2010 (Year: 2010).*
Hardt, "The OAuth 2.0 Authorization Framework", RFC 6749, 2012 (Year: 2012).*
Merriam-Webster, "authenticate", 2019 (Year: 2019).*
Merriam-Webster, "authorize", 2019 (Year: 2019).*
Merriam-Webster, "token", 2019 (Year: 2019).*
Wikipedia, "QR code", 2019 (Year: 2019).*

* cited by examiner

*Discussion User Interface View 450*

*Discussion User Interface View 400*

TECHNIQUES FOR MANAGING DISCUSSION SHARING ON A MOBILE PLATFORM

BACKGROUND

A social networking system, such as a social networking website, enables one or more users to interact with each other in the social networking system by providing social networking services to the one or more users. With the recent increase in mobile devices, numerous users have also begun using their mobile devices to interact with the one or more users in the social networking system. However, this increase in use of mobile devices to access social networking services has also placed an increased demand for improvements in sharing one or more discussions between and among the one or more users.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for managing discussion sharing on a mobile platform. Some embodiments are particularly directed to techniques for managing discussion sharing between and among one or more mobile discussions applications on one or more mobile devices. In one embodiment, for example, an apparatus may include a processor circuit, and memory operatively coupled to the processor circuit. The memory may store the mobile discussions application for execution by the processor circuit, where the mobile discussions application may include, among other components, a discussions imaging component to recognize a ticket associated with a resource of a social networking system, the ticket comprising a machine-readable token, and a discussions management component to enable access to the resource based at least partially on the recognized ticket and user profile information. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1A:
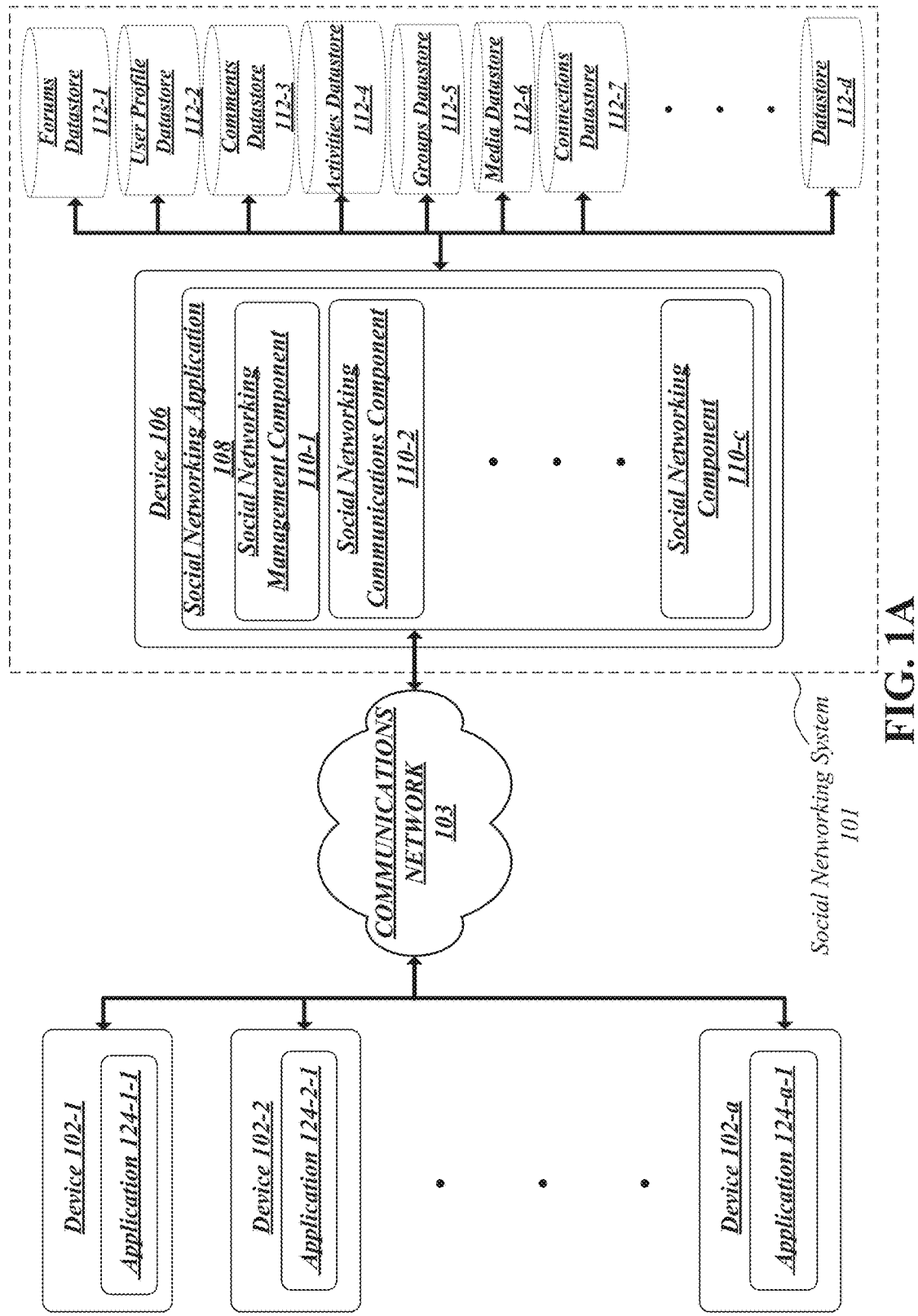
FIG. 1A illustrates an exemplary embodiment of a mobile discussion management system.

Various embodiments are generally directed to a mobile discussions management system to provide management of one or more discussions (e.g., one or more forums and/or groups) and sharing one or more discussions utilizing one or more images comprising discussions invitation tickets in order to build one or more communities in the social networking system. By providing a mobile discussions application for managing and sharing the one or more discussions in the social networking system, the experience of sharing one or more discussions with other users on the mobile platform may be greatly increased. To achieve these goals and other improvements, the mobile discussions application may be generally arranged to share one or more discussions and/or enable access to one or more discussions in the social networking system.

To enable one or more users of a mobile device greater access to one or more discussions in the social networking system, the mobile discussions application may be configured to generate at least one image comprising a discussions invitation ticket. The discussions invitations ticket may include, but is not limited to, a machine-readable invitation signature, a discussions invitation image associated with the forum or group, a forum name or a group name for the forum or group, and/or machine-readable invitation token.

To facilitate efficient sharing of the one or more discussions, the mobile discussions application may be configured to store the generated image in an image datastore (e.g., a camera roll, etc.) of a mobile device and transmit the stored image comprising the discussions invitations ticket to one or more users in the social networking system. Additionally or alternatively, the stored image may be transmitted via one or more non-mobile discussions applications on the mobile device such as, for example, e-mail application, messaging application, browser application, social application, or any other application configured to transmit information to another device over a network.

To store the one or more discussions shared via an image comprising a discussions invitation ticket, the one or more applications such as, for example, e-mail application, messaging application, imaging application, browser application, social application may be arranged to store the received and/or captured image in the image datastore of the mobile device. However, in instances when the one or more applications may not be able to store the received image but may visually present the received image in one or more user interface (UI) views on a display device of the mobile device, the operating system and/or the management application of the mobile device may capture an image of the one or more UI views of the one or more applications (e.g., a "screenshot") being rendered on the display device of the mobile device, where the captured image may include, but is not limited to, the discussions invitation ticket. Furthermore, the mobile discussions application may be configured to capture an image comprising the discussions invitation ticket utilizing the image capture component of the mobile device and store the captured image in the image datastore of the mobile device.

To enable one or more users access to one or more discussions shared via the at least one image comprising a discussions invitation ticket, the mobile discussions application may be further configured to request access to the image datastore of the mobile device. After access has been granted, the mobile discussions application may scan, automatically, the image datastore of the mobile device to recognize the discussions invitation ticket in at least one image stored in the image datastore, where the discussions invitation ticket may include, but is not limited to, a machine-readable invitation signature and a machine-readable invitation token. Moreover, by scanning the images from the image datastore, the users of the mobile discussions application may retain the option to capture and store the at least one image comprising the discussions invitation ticket using their preferred application.

To facilitate the recognition of one or more discussions invitation tickets by a user or by the mobile discussions application, the machine-readable invitation signature may include, but is not limited to, one or more machine readable signature features, such as, for example, a predefined geometric shape having a predefined size, a predefined border thickness, and/or a predefined range of colors which may be specific to a plurality of forums and/or plurality of groups. Moreover, the mobile discussions application may be configured to analyze and detect the one or more machine-readable invitation signatures based at least partially on the one or more machine-readable signature features in order to assist in the recognition of a machine-readable invitation token in the predefined geometric shape.

The mobile discussions application may be further configured to recognize at least one machine-readable invitation token, where the at least one machine-readable invitation token may encode information configured to provide a user having an associated user account and user profile access and/or membership to the one or more discussions associated with the at least one machine-readable invitation token. Once the mobile discussions application decodes the encoded information, the mobile discussions application may be further configured to provide access to a discussion associated with the at least one machine-readable invitation token. Additionally or alternatively, the mobile discussions application may be further configured to provide membership to the discussion by automatically joining the user having the associated user account and user profile as a member of the discussion (e.g., joining as a forum member of a forum or a group member of a group). As a result of these improvements discussed above and elsewhere, the user's experience in building communities by sharing one or more discussions in the social networking system on a mobile platform may be greatly improved.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the needed purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates an exemplary embodiment of a mobile discussion management system 100. In various embodiments, the mobile discussions management system 100 may comprise a social networking system 101 (e.g., Facebook, Google+, LinkedIn, etc.) and one or more devices 102-*a* (e.g., server devices, mobile devices, computing devices, networking devices, etc.) for providing social networking services to enable various users (e.g., persons, businesses, hardware/software components, computing devices, etc.) to communicate and interact between and among each other. To provide the social networking services to various users, the one or more devices 102-*a* associated with various users may be operatively coupled to the social networking system 101 via communications network 103 (e.g., internet, intranet, cellular network, etc.) utilizing various communications mediums (e.g., wired, wireless, fiber optic, etc.) and/or communications standards (e.g., Ethernet IEEE 802.3, Wireless IEEE 802.11, WiMAX IEEE 802.16, Global Systems for Mobile Communications (GSM), Enhanced Data Rates for GSM Evolution (EDGE), Long Term Evolution (LTE), etc.).

It is worthy to note that "a" and "b" and "c" and similar designators as used herein are intended to be variables representing any positive integer. Thus, for example, if an implementation sets a value for a=2, then a complete set of devices 102-a may include devices 102-1 and 102-2. Similarly, if an implementation sets value for a=2, then a complete set of applications 124-a-1 may include applications 124-1-1 and 124-2-1. Furthermore, if an implementation sets value for b=7, then a complete set of applications 124-1-b may include applications 124-1-1, 124-1-2, 124-1-3, 124-1-4, 124-1-5, 124-1-6, and 124-1-7. The embodiments are not limited in this context.

To utilize the social networking services provided by the social networking system 101, each device of the one or more devices 102-a may be configured to execute at least applications 124-a-1. The applications 124-a-1 may be configured to communicate with the social networking system 101 via communications network 103 to provide the social networking services to the users. To maintain a persistent presence and ensure secure access to the social networking system 101, each user of applications 124-a-1 may be associated with a user account in the social networking system 101. Each user account may be represented by user account information. The user account information for each user may include, but is not limited to, user account identifier (e.g., phone number, e-mail address, etc.), user account authentication token (e.g., user account password, physical and/or virtual security tokens, etc.), and/or any other information relevant to the authentication and authorization of each user. To ensure authorized access of each user, the social networking system 101 may be further configured to authenticate each user based on at least a portion of the user account information (e.g., user account identifier, user account authentication token) provide by each user and received from one or more devices 102-a. Once a user having the associated user account has been successfully authenticated, the social networking system 101 may provide the application (e.g., application 124-1-1) with one or more time limited access tokens having a set of access permissions associated with the user account of the user to retrieve, store, modify, update, and/or otherwise access information within a specific time period in the social networking system 101 utilizing the application.

Each user account may be further associated with a user profile representative of a user's presence within the social networking system 101. Each user profile associated with each user may be represented by user profile information, which may include, but is not limited to, user identifier information (e.g., a unique identifier that identifies the user and the user profile information), user biographic and/or demographic information, (e.g., user name information which may include, but is not limited to, a first, middle, and/or last name of the user, an entity name associated with the user, contact information of the user, birth date of the user), user profile media information (e.g., profile image(s) of the user, a focused user profile image of the user, etc.), user location information (e.g., the hometown location of the user, the current location of the user), user time zone information (e.g., time zone of the user, etc.), user social connections information (e.g., a list of friends, family members, coworkers, teammates, classmates, business associates, of the user), user groups membership information, user forums membership information, user interest information (e.g., the interests listed by the user, movies listed by the user, music listed by the user, books listed by the user, approvals or "likes" of the user, or any other information that may identify the user's interest), user employment history information (e.g., list of current and/or past employers of the user), user social message information (e.g., one or more social networking messages where the user is a recipient), user mobile discussions application preferences information (e.g., preferences for application 124-1-1), user profile discussion information (e.g., one or more profile activities, such as, profile posts in the user profile), user group search information (e.g., one or more group search queries inputted by the user) and/or any other preference/personal information associated with the user.

The user groups membership information for the user may include, but is not limited to, a list of user group information representative of the one or more groups the user is a member of in the social networking system 101. Each user group information may include, but is not limited to, group identifier information (e.g., the group identifier associated with a particular group), user group order information (e.g., the position of the user group information in the list of user group information), user group favorite information (e.g., whether the particular group associated with the user group information is a favorite group), group name information (e.g., the group name of the particular group), user group last visit information (e.g., the last date and time the user visited the particular group), user group unread notifications information (e.g., the number of unread notifications associated with the particular group), and/or any other information associated with groups and/or the user.

The user forum membership information for the user may include, but is not limited to, a list of user forum information representative of the one or more forums the user is a member of in the social networking system 101. Each user forum information may include, but is not limited to, forum identifier information (e.g., the forum identifier associated with a particular forum), user forum order information (e.g., the position of the user forum information in the list of user forum information), user forum favorite information (e.g., whether the particular forum associated with the user forum information is a favorite forum), forum name information (e.g., the forum name of the particular forum), user forum last visit information (e.g., the last date and time the user visited the particular forum), user forum unread notifications information (e.g., the number of unread notifications associated with the particular forum), and/or any other information associated with forum and/or the user.

Figure 2A:
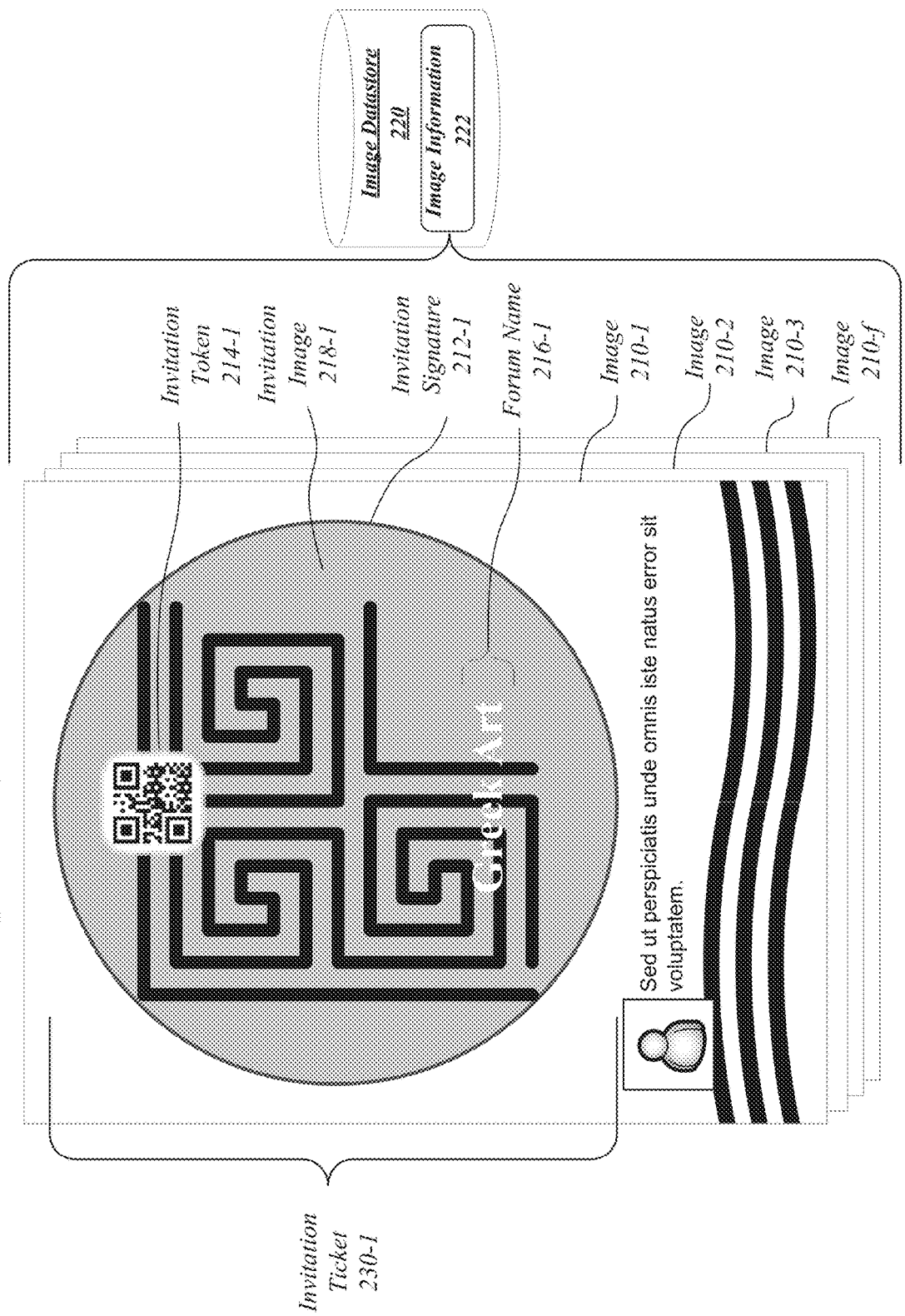
FIG. 2A-2C illustrates exemplary embodiments of image information stored in an image datastore to access and/or join a discussion.
Figure 2B:
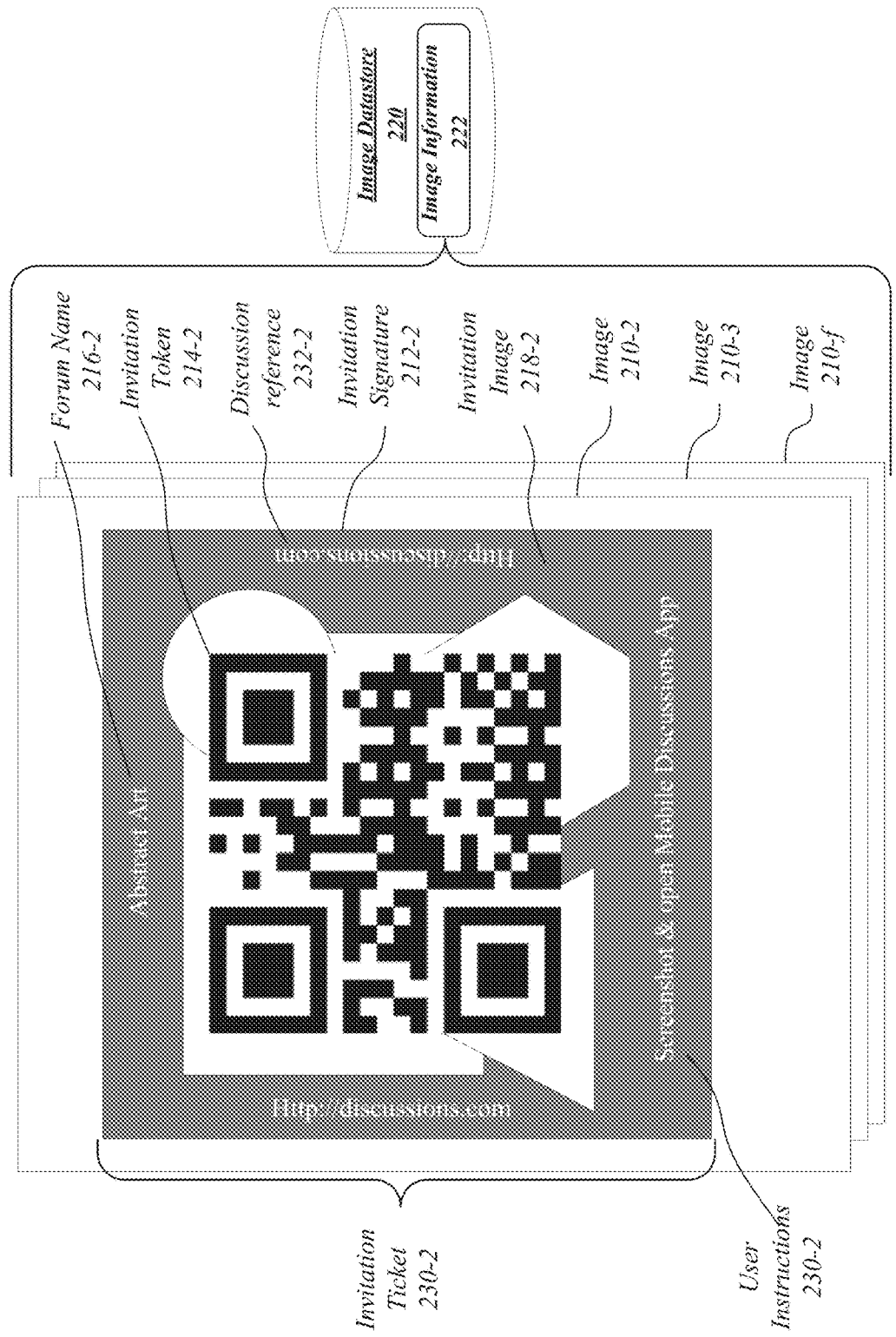
Figure 2C:
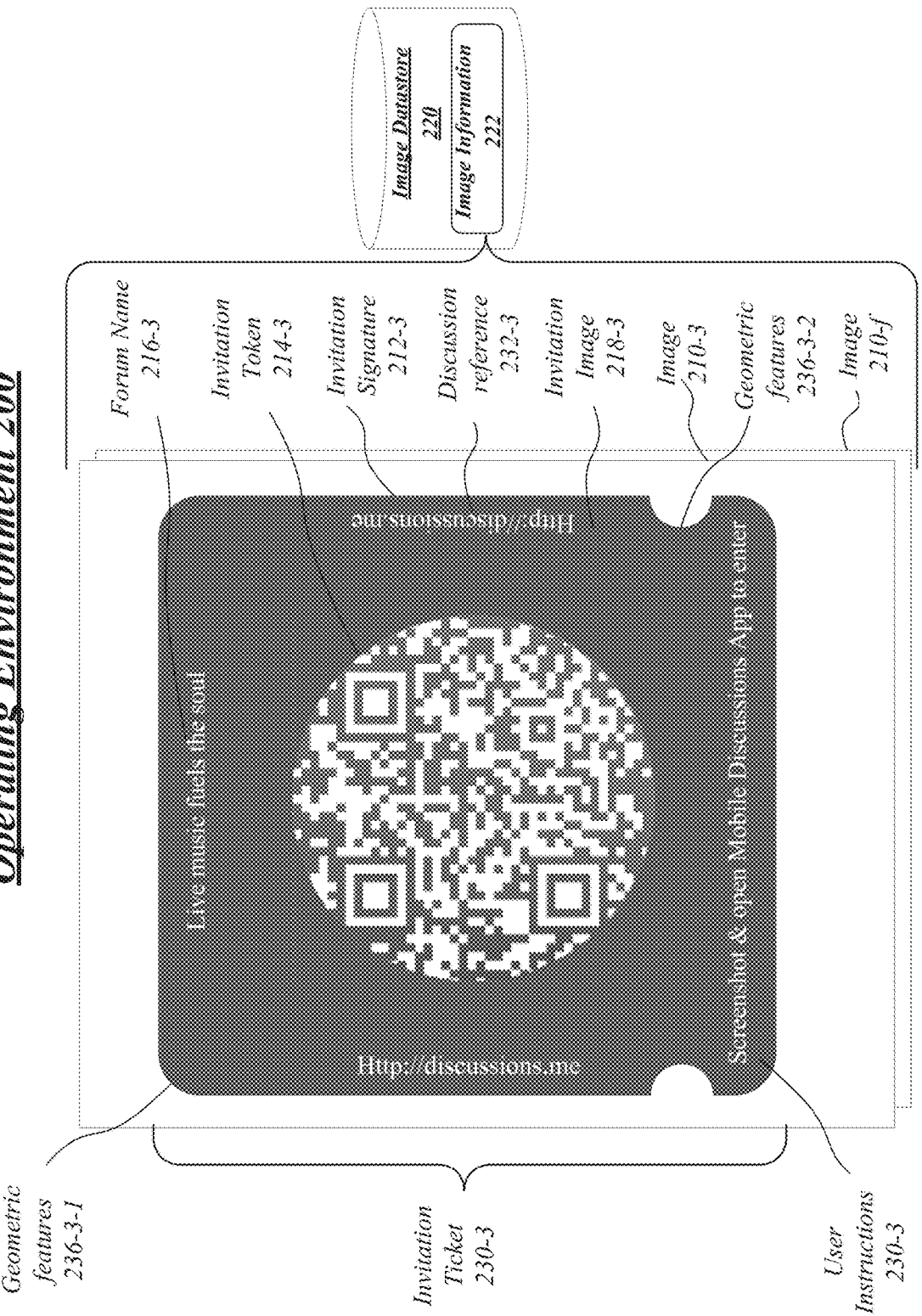
Figure 2D:
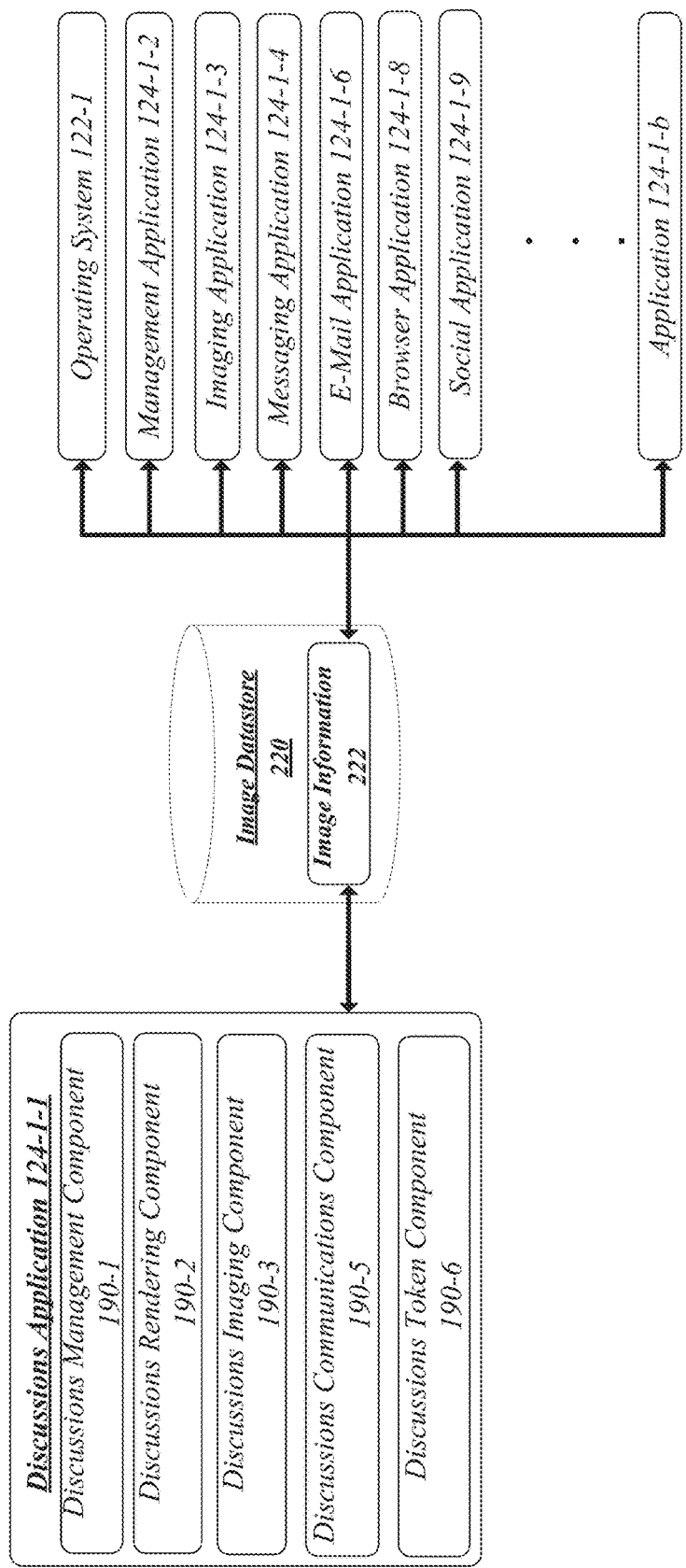
FIG. 2D illustrates an exemplary embodiment for accessing image information stored in an image datastore by one or more applications.

The user mobile discussions application preferences information may include, but is not limited to, image datastore access information (e.g., whether the application 124-1-1 is allowed or denied access to the image datastore such as image datastore 220 of FIG. 2D), scanning setting information (e.g., whether the application 124-1-1 will scan and/or receive updates for image information stored in an image datastore and at which execution states and/or transition of execution states will the application 124-1-1 scan and/or receive updates for the image information stored in the image datastore) for the application 124-1-1.

In some embodiments, the social networking system 101 may enable the applications 124-a-1 to retrieve at least a portion of the user profile information associated with the user and display at least a portion of the user profile information on one or more display screens operatively coupled to the devices 102-a. To facilitate user interaction between and among users in the social networking system 101, the social networking system 101 may also enable users to search user profile of other users based at least partially on a received search query and at least a portion of the user profile information associated with other users, retrieve at least a portion of the user profile information of the other users, and form one or more social connections with other users by enabling users via the applications 124-a-1 to identify other users as the user's friend, family member (e.g., spouse, cousin, mother, father, grandmother, grandfather, brother, sisters, daughter, son, etc.), coworker, teammate, classmate, business associate, or any other social relationship.

It may be appreciated that the social connections formed between a pair of users may be unidirectional, when only one user in the pair of users identifies and acknowledges the type and existence of social relationship. Alternatively, the social connections formed between the pair of users may be bidirectional when both users in the pair of users identify the same type of social relationship and the existence of social relationship. As such, the social networking system 101 further receive, provide, and/or update user social connections information which may include, but is not limited to, a list of social connection information representative of the social connections of the user (e.g., the user identifier information or other resource or social networking object the user is connected to) and the social connection type information representative of a social connection type (e.g., friend, family member, coworker, teammate, classmate, business associate, and/or any other social relationship) associated with each social connection. Based on the user social connections information of a plurality users, the social networking system 101 may be further configured to determine social proximity information which may include, but is not limited to, the degree of separation between one or more pairs of users.

In some embodiments, the social networking system 101 may further enable users to create, publish, or post one or more profile activities (e.g., posts, polls, Universal Resource Identifier/Universal Resource Locator (URI/URL) references, etc.), or any other information on the user's own user profile represented by the user profile information. Additionally, in some embodiments, the social networking system 101 may further enable some users to create, publish, post one or more profile activities on user profiles of other users based at least partially on the user social connection information of the other users. The social networking system 101 may also enable users to send and/or receive private social messages to one or more users by communicating the social message information comprising one or more private social messages to and from one or more users.

To provide collaboration and between and among a specific set of users, including between and among users that may not have a social connection with other users in the specific set of users, the social networking system 101 may further enable the association and/or management of one or more groups and/or one or more forums.

In some embodiments, each group may be represented by social group information, which may include, but is not limited to, group identifier information (e.g., a unique identifier that identifies a particular group in the social networking system 101), group privacy information (e.g., group privacy type for the particular group which may include, but is not limited to, secret group type, open group type, or closed group type), group cover image information, group description information (e.g., a description associated with the particular group), group name information (e.g., the group name of the particular group), group owner information (e.g., the owner of the particular group), group location information (e.g., the location of the particular group), group membership information (e.g., a list of group members in the particular group), group membership count information (e.g., a total number of group members in the particular group), group administrators information (e.g., a list of group members that are administrators in the particular group), group documents information (e.g., a list of documents shared in the particular group), group files information (e.g., a list of files shared in the particular group), group events information (e.g., a list of events shared in the particular group), group discussion information (e.g., a list of group activity information in the particular group such as group posts, group polls, etc.), group tags information (e.g., one or more terms associated with the group), face piles information (e.g., a limited list of profile identifier information representative of one or more group members) or any other information associated with one or more groups.

In some embodiments, each forum may be represented by social forum information, which may include, but is not limited to, forum identifier information (e.g., a unique identifier that identifies a particular forum in the social networking system 101), forum cover image information, forum description information (e.g., a description associated with the particular forum), forum name information (e.g., the forum name of the particular forum), forum membership count information (e.g., a total number of group members in the particular forum), forum founder information (e.g., the founder or creator of the particular forum), forum location information (e.g., the location of the particular forum), forum membership information (e.g., a list of forum members in the particular forum), forum editor information (e.g., a list of forum members that are editors in the particular forum), forum top contributors information (e.g., ranked list of top contributors in the forum), forum documents information (e.g., a list of forum shared in the particular forum), forum files information (e.g., a list of files shared in the particular forum), forum discussion information (e.g., a list of forum activity information in the particular forum such as forum threads, forum polls, etc.), or any other information associated with one or more forums.

In some embodiments, the social networking system 101 may enable users to create one or more groups in the social networking system 101 utilizing the one or more applications 124-a-1. Moreover, the social networking system 101 may enable users to create one or more groups by receiving at least a portion of the social group information (e.g., group privacy information, group cover image information, group description information, group name information, group owner information, group membership information), and creating a group based at least partially on the received social group information.

In some embodiments, the social networking system 101 may enable users to create one or more forums in the social networking system 101 utilizing the one or more applications 124-a-1. Moreover, the social networking system 101 may enable users to create one or more forums by receiving at least a portion of the social forum information (e.g., forum cover image information, forum description information, forum name information, forum founder information, forum membership information), and creating a forum based at least partially on the received social forum information.

In some embodiments, the social networking system 101 may also enable users to search for one or more groups and/or one or more forums in the social networking system 101 utilizing the one or more applications 124-a-1. Moreover, the social networking system 101 may enable users to input one or more search queries utilizing the one or more applications 124-a-1 and providing one or more search results to the one or more applications 124-*a*-1 based at least partially on the one or more received search queries. In other embodiments, the search of one or more groups and/or forums may be limited.

In some embodiments, group membership may be based at least partially on one or more invitations (e.g., discussions invitation tickets, etc.) created, rendered, and/or generated by one or more group members, and the users may receive invitations to join and/or request to join one or more groups as group members to discuss (e.g., publishing group posts and/or group polls in a group discussion and/or publishing comments associated with the group posts and/or group polls), message (e.g., sending and/or receiving one or more private social messages to and/or from one or more group members), and/or otherwise share information (e.g., sharing group events, group files, group documents, etc.) with other group members within the group and/or other users that are not group members of the group (i.e., non-group members).

In some embodiments, forum membership may be based at least partially on one or more invitations (e.g., discussions invitation tickets) created, rendered, and/or generated by one or more forum members, and the users may receive invitations to join one or more forums as forum members and publish one or more forum threads and/or posts (e.g., publishing forum threads in a forum discussion and/or publishing one or more posts associated with the one or more threads), message (e.g., sending and/or receiving one or more private social messages to and/or from one or more forum members), and/or otherwise share information (e.g., sharing forum events, forum files, forum documents, etc.) with other forum members within the forum.

In some embodiments, the group discussions, messages, and/or shared information, within group may be generally restricted or otherwise limited to group members of the group based at least partially on group privacy information associated with the group. Stated differently, based at least partially on group privacy information associated with each group, the posts, messages, and/or shared information, within the group, may generally be viewable or otherwise accessible only to group members of that group. In some embodiments, the forum threads and/or posts, messages, and/or shared information, within a forum may be similarly restricted or otherwise limited to forum members of the forum. Additionally, in some embodiments, access to forum threads and/or posts, messages, and/or shared information, within a forum may be restricted to forum members only and membership may also be generally restricted to invitation only.

In some embodiments, the social networking system 101, may provide users with the latest updates regarding the activities of their social connections, groups, or any other aspects of users' online presence. To provide the latest updates, the social networking system 101 may generate and/or provide users with one or more notifications regarding the activities of their friends, family members, coworkers, teammates, classmates, business associates (i.e., user notifications), one or more notifications regarding the activities within one or more groups where the users may be group members (i.e., user group notifications), and/or one or more notifications regarding the activities within one or more forums where the users may be forum members (i.e., user forum notifications). Each user notification, user group notification, and/or user forum notification, may comprise user notification information, which may include, but is not limited to, notification creation time information (e.g., the time when the notification as created), notification source name information (e.g., the name of the user or any other resource or social networking object that created or caused the creation of the notification), notification source identifier information (e.g., the user identifier information or other resource or social networking object that create the notification or caused the creation of the notification), a notification identifier information (e.g., a unique identifier associated with the notification), a notification message information (e.g., the text associated with the notification), a notification object information (e.g., the group, the forum, or other resource or social networking object associated with the notification).

To provide users with these and other social networking services, the social networking system 101 may comprise server device 106 which may include, among other applications, social networking application 108. The social networking system 101 may further comprise one or more datastores 112-*d* operatively coupled to the server device 106. The one or more datastores 112-*d* may be configured to store one or more resources or social networking objects representative of the information received and provided by the social networking system 101. Moreover, the social networking objects of the social networking system 101 may include, but is not limited to, one or more forums which may be stored in the forums datastore 112-1, one or more user profiles which may be stored in the user profiles datastore 112-2, one or more comments which may be stored in the comments datastore 112-3, one or more activities (e.g., posts, polls, threads, etc.) which may be stored in the activities datastore 112-4, one or more groups which may be stored in groups datastore 112-5 (e.g., group description, group name, etc.), media (e.g., images, videos, illustrated graphical objects, i.e., "Stickers," animated images, files, applications, etc.) stored in the media datastore 112-6, or any other social networking object that may be received, stored, provided, or otherwise tracked and/or accessed by the social networking system 101 to provide the users with these and other social networking services.

The one or more datastores 112-*d* may further store object connections between two or more objects or resources in the object connections datastore 112-7. Moreover, the object connections may be representative of the relationship or links between the two or more objects. The one or more social networking objects in conjunction with one or more objects connections may form a social graph comprising two or more nodes interconnected via one or more edges, where each node may be representative of a social networking object and each edge may be representative of the object connections between two or more social networking objects in the social networking system 101. To enable the applications 124-*a*-1 to retrieve, modify, update or otherwise access the various information managed by the social networking system 101 and represented as the social graph, the social networking application 108 may further provide a graph application program interface (API) utilizing various protocols (e.g., HTTP, HTTPs, etc.).

In some embodiments, the social networking application 108 may include one or more social networking components 110-*c*. At least some of the one or more social networking components 110-*c* may be arranged to implement at least a portion of the graph API. The one or more social networking components 110-*c* may include, but is not limited to, a social networking management component 110-1 generally arranged to enable association and management of one or more groups by one or more users, enable association and management of one or more user profiles and/or user accounts by one or more users, enable association and management of one or more forums by one or more users, generate one or more notifications based at least partially on one or more users' activity in the social networking system 101, provide the one or more notifications to one or more applications 124-*a*-1 to notify one or more users, search for information in the social networking system 101 in response to one or more search queries received from one or more users via applications 124-*a*-1, and provide search results to one or more users via the one or more applications 124-*a*-1. The social networking application 108 may further include a social networking communications component 110-2 configured to provide communications for the one or more social networking components 110-*c* and communicate with the one or more applications 124-*a*-1 via communications network 103.

Figure 1B:
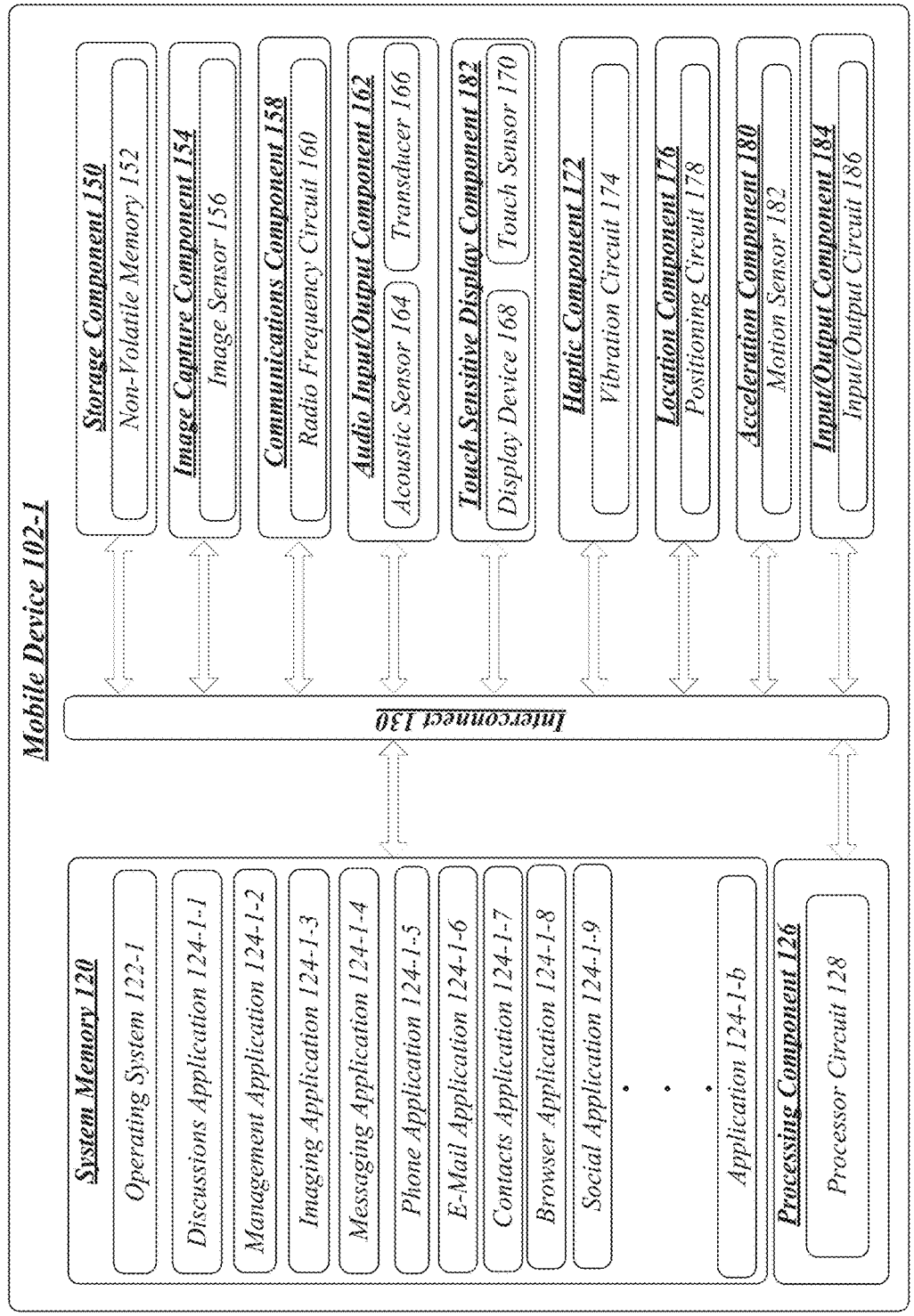
FIG. 1B illustrates an exemplary embodiment of a device, which may be a mobile device, comprising one or more applications.

FIG. 1B illustrates an exemplary embodiment of a device 102-1, which may be a mobile device 102-1 (e.g., a mobile phone or any other a portable computing and/or communications device), comprising one or more applications 124-1-*b*, in the mobile groups management system 100. The mobile device 102-1 may be generally arranged to provide mobile computing and/or mobile communications and may include, but is not limited to, system memory 120, processing component 126, storage component 150, image capture component 154, communications component 158, acoustic input/output component 162, touch sensitive display component 182, haptic component 172, location component 172, acceleration component 180 and input/output component 184, where each of the components and system memory 120 may be operatively connected via interconnect 130.

In some embodiments, the processor component 126 may be generally arranged to execute instruction information including one or more instructions. In some embodiments, the processor component 126 may be a mobile processor component or system-on-chip (SoC) processor component which may comprise, among other elements, processor circuit 128. The processor circuit 128 may include, but is not limited to, at least one set of electronic circuits arranged to execute one or more instructions. Exemplary processor components 126 may include, but is not limited to, Qualcomm® Snapdragon®, Nvidia® Tegra®, Intel® Atom®, Samsung® Exynos, Apple® A7®, Apple® A8®, or any other type of mobile processor(s) arranged to execute the instruction information including the one or more instructions stored in system memory 120 and/or storage component 150.

In some embodiments, the storage component 150 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In some embodiments, the image capture component 154 may be generally arranged to capture one or more images or a sequence of one or more images (e.g., video, etc.) and provide image information and/or video information. The image capture component 154 may include, among other elements, image sensor 156. Exemplary image sensors 156 may include, but is not limited to, charged-coupled devices (CCD), active-pixel sensors (APS), or any other type of image sensors arranged for converting optical images into electronic signals that may be compressed, encoded, and/or stored as image information and/or video information.

In some embodiments, the communications component 158 may be generally arranged to enable the mobile device 102-1 to communicate with the social networking system 101 via the communication network 103. The communications component 158 may include, among other elements, a radio frequency circuit 160 configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), etc.).

In some embodiments, the acoustic input/output (I/O) component 162 may be generally arranged for converting sound, vibrations, or any other mechanical waves received into electronic signals representative of acoustic input information utilizing an acoustic sensor 164 (e.g., a microphone, etc.). Additionally, the acoustic I/O component 162 may be further arranged to convert electronic signals representative of acoustic output information utilizing an electroacoustic transducer 166 (e.g., a speaker, etc.) to output sound, vibrations, or any other mechanical waves.

In some embodiments, the touch sensitive display component 182 may be generally arranged to receive and present visual display information, and provide touch input information based on detected touch based or contact based input. Moreover, the touch sensitive display component 182 may include, among other elements, a display device 168 (e.g., liquid-crystal display, light-emitting diode display, organic light-emitting diode display, etc.) for presenting the visual display information and touch sensor 170 (e.g., resistive touch sensor, capacitive touch sensor, etc.) associated with the display device 168 to detect and/or receive touch or contact based input information via associated with the display device 168. Additionally, in some embodiments, the touch sensor 170 may be integrated with the surface of the display device 168, so that a user's touch or contact input may substantially correspond to the presented visual display information on the display device 168.

In some embodiments, the haptic component 172 may be generally arranged to provide tactile feedback through the housing, case, or enclosure of the mobile device 102-1. Moreover, the haptic component 172 may include, among other elements, a vibration circuit 174 (e.g., an oscillating motor, vibrating motor, etc.) arranged to convert haptic information to mechanical vibrations representative of tactile feedback.

In some embodiments, the location component 176 may be generally arranged to receive positioning signals representative of positioning information and provide location information (e.g., approximate physical location of the current mobile device 102-1) based at least partially on the received positioning information. Moreover, the location component 176 may include, among other elements, a positioning circuit 178 (e.g., a global positioning system (GPS) receiver, etc.) arranged to determine the physical location of the mobile device 102-1. In some embodiments, the location component 176 may be further arranged to communicate and/or interface with the communications component 158 and communicate with the communications network 103 in order to provide greater accuracy and/or faster location acquisition of the location information.

In some embodiments, the acceleration component 180 may be generally arranged to detect acceleration of the mobile device 102-1 in one or more axes. The acceleration component 180 may include, among other elements motion sensor 182 (e.g., accelerometer, etc.) to convert physical motions applied the mobile device 102-1 into motion information.

In some embodiments, the input/output component 184 may be generally arranged to provide signal I/O and may include, among other elements, input/output circuit 186. Exemplary input/output components 184 may include, but is not limited to, microphone input component, headphone output component, universal serial bus (USB) component, or any other signal input/output component.

In some embodiments, the system memory 120 may be generally arranged to store information in volatile and/or nonvolatile high speed memory similar to those discussed with respect to storage component 150. In some embodiments, at least a portion of the stored information in the system memory 120 may comprise instruction information arranged for execution by the processing component 126. In those embodiments, the instruction information may be representative of at least one operating system 122-1, one or more applications **124-1-*b*, and/or any other programs and/or modules. In some embodiments, the one or more applications 124-1-*b* may include, but is not limited to, a management application 124-1-2 generally arranged to manage the execution of the one or more applications 124-1-*b* of the mobile device 102-1. The one or more applications 124-1-*b* may further include, but is not limited to, mobile discussions application 124-1-1. The one or more applications 124-1-*b* may also include, but is not limited to, non-mobile discussions applications, which may include, but is not limited to, management application 124-1-2, imaging application 124-1-3, messaging application 124-1-4, phone application 124-1-5, e-mail application 124-1-6, contacts application 124-1-7, browser application 124-1-8, social application 124-1-9, or any other application that is not the mobile discussions application 124-*a*-1**.

In some embodiments, the operating system 122-1 may comprise a mobile operations system 122-1 (e.g., Apple®, iOS®, Google® Android®, HP® WebOS®, Microsoft® Windows Phone®, Microsoft® Windows®, etc.) general arranged to manage hardware resources (e.g., one or more components of the mobile device 102-1) and/or software resources (e.g., one or more applications **124-1-*b* of the mobile device 102-1). The operating system 122-1 may be further arranged to modify execution states associated with one or more applications 124-1-*b* based at least partially on information received from one or more components (e.g., touch sensitive display component 182, input/output component 184, location component, audio I/O component 158, etc.) and/or one or more applications (e.g., management application 124-1-1, phone application 124-1-5, e-mail application 124-1-6, messaging application 124-1-4, social application 124-1-9**, etc.).

In some embodiments, the operating system 122-1 may be arranged to modify execution states by transitioning the one or more applications **124-1-*b* between and among the one or more execution states. The one or more execution states may include, but is not limited to, foreground state, non-execution state, suspended state, and/or background state. In some embodiments, applications 124-1-*b* may be initially in the non-execution state where the instruction information associated with applications 124-1-*b* in the non-execution state are not executed by the processor component 126 nor scheduled for execution by the processor component 126**.

In some embodiments, the operating system 122-1 may transition an application (e.g., mobile discussions application 124-1-1) initially in the non-execution state to the foreground state, in response to receiving a request to execute or initiate the execution of the application previously in the non-execution state (e.g., launching the application). In some embodiments, the operating system 122-1 may transition the application in a non-execution state to the foreground state where the instruction information associated with the application is executed or scheduled for execution by the processor component 126 as one or more processes in order to provide mobile computing operations associated with the application to the one or more users. In some embodiments, the operating system 122-1 may be further arranged to retrieve at least a portion of the application that is to be executed from the storage component 150 and store at least a portion of instruction information associated with an application (e.g., management application 124-1-2, mobile discussions application 124-1-1, imaging application 124-1-3, etc.) in system memory 120 so that processing component 126 may retrieve and execute the instruction information associated with the application from system memory 120 as one or more processes. It may be appreciated that when an application (e.g., mobile discussions application 124-1-1) is in the foreground state, one or more UI views associated with the application in the foreground state may be at least partially visible on the display device 168 of the touch sensitive display component 182 in order to process information (e.g., input information, etc.) received from one or more components (e.g., touch sensor 170, etc.) of the mobile device 102-1 via one or more asynchronous and/or synchronous events.

In some embodiments, the operating system 122-1 may transition an application (e.g., mobile discussions application 124-1-1) may transition from the foreground state to the suspended state, in response to a request to launch a different application (e.g., transitioning the different application, such as, for example, browser application 124-1-8 from non-execution state to the foreground state), switch to a different application (e.g., transitioning the different application, such as, for example, browser application 124-1-8 from background state to the foreground state), or resume a different application (e.g., transitioning the different application, such as, for example, browser application 124-1-8 from suspended state to the foreground state). In some embodiments, the operating system 122-1 may transition the application from the foreground state to the suspended state where the instruction information associated with the application may be temporarily stopped or prevented from further execution by the processor component 126 and the execution context information (e.g., the information stored in processor registers, at least a portion of the application allocated in system memory 120, etc.) may be saved to the system memory 120 and/or storage component 150. In some embodiments, the operating system 122-1 may continue to store at least a portion of the suspended application in system memory 120 so that the suspended application may continue to reside or remain in system memory 120 which may enable the application in the suspended state to be quickly resumed (e.g., transitioning the application from the suspended state to the foreground state).

In some embodiments, the operating system 122-1 may transition an application (e.g., mobile discussions application 124-1-1) may transition from the foreground state to the suspended state, in response to a request to launch a different application (e.g., transitioning the different application, such as, for example, browser application 124-1-8 from non-execution state to the foreground state), switch to a different application (e.g., transitioning the different application, such as, for example, browser application 124-1-8 from background state to the foreground state), or resume a different application (e.g., transitioning the different application, such as, for example, browser application 124-1-8 from suspended state to the foreground state). In some embodiments, the operating system 122-1 may transition the application from the foreground state to the background state where a limited portion of the instruction information (e.g., instruction information associated with a background thread of the application, etc.) associated with the application is continued for further execution by the processor component 126 while the one or more UI views may not be visible or partially visible on the display device 168.

In some embodiments, the operating system 122-1 may transition an application (e.g., mobile discussions application 124-1-1) from the foreground state to non-execution state, in response to a request to close, terminate, and/or kill the application or the complete execution of the instruction information associated with the application by the processing component 126. In some embodiments, the operating system 122-1 may transition the application in the foreground state to the non-execution state where the processing component 126 stops executing most if not all instruction information associated with the application. In some embodiments, the operating system 122-1 may also free (e.g., remove, purge, otherwise make available, etc.) at least a portion of the system memory 120 previously storing the instruction information and/or execution context information associated with the application transitioning to the non-execution state.

In some embodiments, the management application 124-1-2 may be visually presented as a home screen UI view (not shown) comprising a plurality of UI elements representative of applications 124-1-*b* and may be generally arranged to launch on startup of the mobile device 102-1 and operating system 122-1. Additionally, the management application 124-1-2 may be arranged to receive touch input information from the touch sensitive display component 182 in order to launch one or more applications 124-1-*b*. In some embodiments, the management application 124-1-2 may be arranged to request the operating system 122-1 to launch or initiate the execution of one or more applications 124-1-*b* of mobile device 102-1 based at least partially on the received input information (e.g., touch based input information received from touch sensor 170, etc.).

In some embodiments, the operating system 122-1 and/or management application 124-1-2 may be arranged to store image information being visually presented on display device 168 as "screenshots" by capture images of one or more UI views of one or more applications 124-1-*b* executing in the foreground on the mobile device 102-1 and visually presented on display device 168 of the touch sensitive display component 182. Additionally, the operating system 122-1 and/or management application 124-1-2 may be further arranged to store the captured images in an image datastore (e.g., image datastore 220 further discussed with respect to FIG. 2D).

In some embodiments, the imaging application 124-1-3 may be generally arranged to receive, store, display and/or otherwise manage image information and/or video information via the image capture component 154. In some embodiments, the message application 124-1-4 may be generally arranged to receive, transmit, display, and/or otherwise manage one or more messages including multimedia messages (e.g., pictures, videos, audio, etc.) utilizing one or more cellular and/or internet messaging services via one or more components of the mobile device 102-1. In some embodiments, the phone application 124-1-5 may be generally arranged to receive, make, display, and/or otherwise manage one or more audio and/or video phone calls utilizing one or more cellular and/or internet phone services via one or more components of the mobile device 102-1. In some embodiments, the e-mail application 124-1-6 may be generally arranged to receive, compose, display, and/or otherwise manage one or more one or more e-mails messages utilizing one or more components of the mobile device 102-1. In some embodiments, the browser application 124-1-8 may be generally arranged to access one or more web pages utilizing one or more utilizing one or more components of the mobile device 102-1. In some embodiments, the social application 124-1-9 may be generally arranged to provide social networking services between and among one or more users of one or more devices (e.g., Twitter®, Vine®, Facebook®, Reddit®, Digg®, Imgur®, etc.).

In some embodiments, the contacts application 14-1-7 maybe generally arranged to add, remove, store, and/or otherwise manage mobile device contact information associated with one or more applications 124-1-*b* (e.g., messaging application 124-1-4, phone application 124-1-5, e-mail application 124-1-6, etc.) used to identify one or more users and communicate between and among the identified one or more users of the one or more mobile devices 102-*a* utilizing the one or more applications 124-1-*b* and/or one or more components of the mobile device 102-1. The mobile device contact information may include, but is not limited to, a list of individual contact information representative of one or more contacts. The individual contact information may include, but is not limited to contact name information (e.g., first, last, and middle name of a contact), contact phone number information (e.g., phone number of the contact), contact e-mail address information (e.g., e-mail address of the contact), or any other information associated with a contact.

In some embodiments, the mobile discussions application 124-1-1 may be generally arranged to enable one or more users of the mobile device 102-1 to associate with or manage one or more discussions (e.g., social groups and/or social forums) in the social networking system 101. In some embodiments, the mobile discussions application 124-1-1 may be generally launched from the home screen UI view (not shown) of the management application 124-1-2 based at least partially on touched input information received from the touch sensitive display component 182. In some embodiments, the mobile discussions application 124-1-1 may be configured to request access and/or obtain access to the mobile device contact information.

Additionally or alternatively, in some embodiments, the mobile discussions application 124-1-1 may be configured to enable mobile deep linking utilizing a deep link reference (e.g., a universal resource identifier (URI), universal resource locator (URL), etc.) associated with the mobile discussions application 124-1-1. The deep link reference associated with the mobile discussions application 124-1-1 may include, but is not limited to, application identification information (e.g., a unique identifier associated with the mobile discussions application 124-1-1). In some embodiments, the deep link reference associated with the mobile discussions application 124-1-1 may further optionally include, but is not limited to, application location information (e.g., an identifier associated with a specific location within the groups application 124-1-1, such as, group identifier information) configured to enable a non-mobile discussions application (e.g., home screen UI view of the management application 124-1-2, imaging application 124-1-3, messaging application 124-1-3, phone application 124-1-5, e-mail-application 124-1-6, contacts application 124-1-7, browser application 124-1-8, social application 124-1-9, or any other application 124-1-*b* that is not mobile discussions application **124-*a*-1) to directly launch or transition to a specific location (e.g., discussions UI view for one or more groups and/or one or more forums, a discussion UI view for a specific group and/or specific forum identified by application location information) within the mobile discussions application 124-1-1 from the non-mobile discussions application based at least partially on touch input information received from the touch sensitive display component 182**.

Figure 1C:
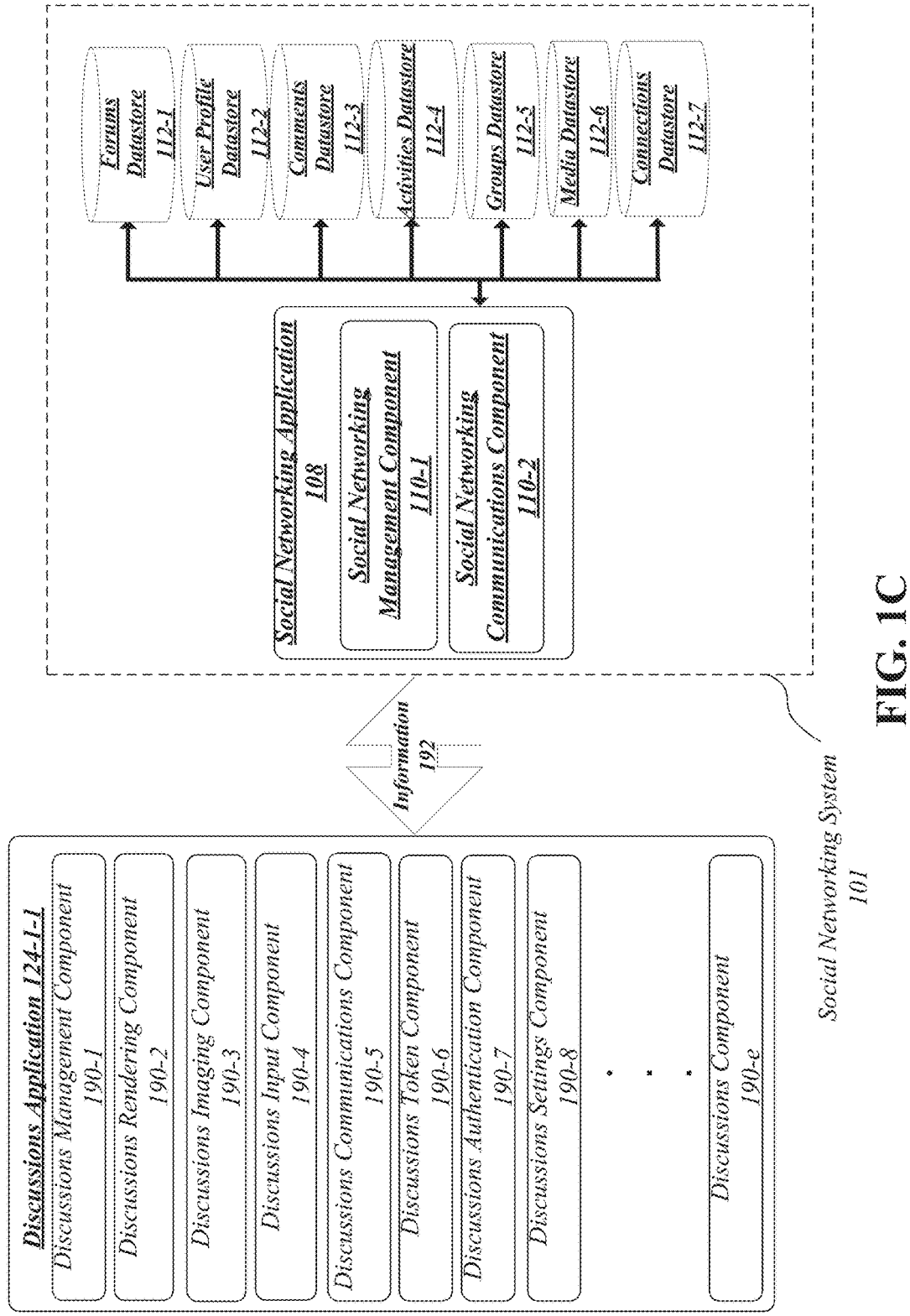
FIG. 1C illustrates an exemplary embodiment of the mobile discussions application for managing at least one discussion forum.

FIG. 1C illustrates an exemplary embodiment of the mobile discussions application 124-1-1 for managing at least one forum and/or at least one group. The mobile discussions application 124-1-1 may include one or more discussions components 190-*e*. The one or more discussions components 190-*e* may include, but is not limited to, discussions management component 190-1, discussions rendering component 190-2, discussions imaging component, discussions input component 190-4, discussions communications component 190-5, discussions token component 190-6, and/or discussions authentication component 190-7.

The discussions authentication component 190-7 may be generally arranged to authenticate a user having an associated user account based on at least a portion of the user account information (e.g., user account identifier and user account authentication token) inputted by the user utilizing, for example, an on-screen virtual keyboard or any other input information. Once the user having the associated user account has been authenticated, the discussions authentication component 190-7 may be configured to receive one or more time limited access tokens from the social networking application 108, and store the one or more time limited access tokens in the storage component 150 and/or system memory 120 of the mobile device 102-1 for use by the one or more discussions components 190-*e* to access information in the social networking system 101 via the discussions communications component 190-5.

The discussions communications component 190-5 may be generally arranged to receive, transmit, and/or otherwise facilitate communications of information between the one or more groups components 190-*e* and the one or more social networking components 110-*c* (e.g., social networking communications component 110-2) and, utilizing one or more APIs (e.g., graph API), the received, stored, and/or cached one or more time limited access tokens, one or more components of the mobile device 103 (e.g., the communications component 158), and communications network 103.

The discussions imaging component 190-3 may be generally arranged to manage capturing image information and/or recognizing one or more discussions invitation tickets comprising one or more machine-readable invitation signatures (e.g., machine-readable invitation signatures 212-*h* further discussed with respect to FIG. 2A-2C) in image information (e.g., image information 222 stored in image datastore 220 further discussed with respect to FIG. 2D). In some embodiments, the discussions imaging component 190-3 may be configured to receive image information by utilizing, interfacing, and/or communicating with the image capture component 154 and store the received image information in an image datastore (e.g., image datastore 220 further discussed with respect to FIG. 2D), in response to input information (e.g., input information to request the capture an image via a selectable UI element, etc.) received from one or more components (touch sensor 170 of the touch sensitive display component 182) of the mobile device 102-1. In some embodiments, the received image information may comprise one or more images stored in one or more image containers such as, for example, compressed or uncompressed image files in one or more image file formats (e.g., jpeg format, png format, raw format, bmp format, etc.). Additionally or alternatively, the discussions imaging component 190-3 may be configured to utilize, interface, and/or communicate with the imaging application 124-1-3 to receive and store the image information comprising the one or more images.

In some embodiments, the discussions imaging component 190-3 may be further configured to scan at least a portion of the image information to recognize one or more discussions invitation tickets, in response to a request from the discussions management component 190-1 to initiate the scan. In some embodiments, the discussions imaging component 190-3 may be configured to scan at least one image in the list of images representative of the image information. To improve efficiency and reduce redundancy of any subsequent scanning and/or recognition process, in some embodiments, the discussions imaging component 190-3 may be further configured to create, add, remove, and/or store a list of scanned images. The scanned images may comprise the names of image containers (e.g., file names of the images stored in one or more image files, etc.) that was previously scanned by discussions imaging component 190-3. The discussions imaging component 190-3 may be further configured to create and/or store a list of un-scanned images based at least partially on the list of scanned images and the list of images.

In some embodiments the discussions imaging component 190-3 may be further configured to recognize discussions invitation tickets by analyzing the one or more images and detecting one or more machine-readable invitation signatures in the one or more images. In some embodiments, the machine-readable invitation signatures may comprise one or more machine-readable invitation signature features, where the one or more machine-readable invitation signature features may include, but is not limited to, one or more predefined geometric shapes (e.g., circular shape, square shape, polygon shape, star shape, etc.), where each predefined geometric shape may have a predefined size (e.g., size of radius for the geometric shape in a unit of measurement such as a radius of at least 300 pixels etc.), a predefined border thickness (e.g., a thickness in a unit of measurement such as a thickness of at least 10 pixels, etc.), a predefined range of colors encoded as a numeral value (e.g., or a range of numerical values, such as, for example, a color code or a range of color codes representative of one or more colors in the Red-Green-Blue (RGB) color space in hexadecimal format, such as, "0xFF0000", "0xFF0000" to "0xFF9999", etc.), and/or one or more predefined geometric features (e.g., one or more convex, concave, curved regions, etc.).

In some embodiments, some machine-readable invitation signature features may be specific to forums while other machine-readable invitation signature features may be specific to groups and some machine-readable invitation signature features may be common to both forums and groups. For example, the machine-readable invitation signature features for one or more forums and/or one or more groups may include a circular shape and/or square shape, a border thickness of 10 pixels, and size based on a radius for the circular shape and/or square shape of at least 300 pixels. In another example, one or more forums may be associated with the circular shape and/or square shape in a first range of colors, while one or more groups may be associated with a circular shape and/or square shape in a second range of colors. In yet another example, one or more forums may be associated with the circular shape in a first range of colors, while one or more groups may be associated with a square shape in a second range of colors, where the first range of colors and second range of colors are mutually exclusive. In a further example, some forums may be associated with a square shape, while other forums may be associated with a square shape having one or more predefined geometric features such as one or more curved corners and/or concave regions. The embodiments are not limited in this context.

In some embodiments, after the discussions imaging component 190-3 recognizes the discussions invitation tickets, the discussions imaging component 190-3 may be configured to further provide a list of images comprising the discussions invitation ticket, i.e., a list of discussions invitation ticket images to the discussions token component 190-6. Optionally, after the discussions imaging component 190-3 recognizes the one or more discussions invitation tickets, the discussions imaging component 190-3 may be configured to identify the boundaries of the discussions invitation tickets in one or more discussions invitation ticket images. The discussions imaging component 190-3 may be configured to provide a list of boundary information representative of the boundaries for each discussions invitation ticket in each discussions invitation ticket image and the list of In some embodiments, the decoded token information may be associated with one or more discussions (e.g., one or more social forums and/or one or more social groups). Furthermore, in those embodiments, the decoded token information may include, but is not limited to, a discussions invitation token, such as, for example, an alphanumeric value and/or URIs/URLs (e.g., https://www.discussions.com/socialgroupinvite/02393hahfh0a3, https://www.discussions.com/socialforuminvite/490853soahadohfa, https://www.discussions.com/socialdiscussioninvite/adfalku38243, etc.), associated with the one or more social forums and/or social groups that provide a "ticket" to enable a user having an associated user account and user profile to access or become a member of one or more "rooms," i.e. discussions (e.g., one or more social forums and/or one or more social groups) in the social networking system 101. Moreover, in some embodiments, absent of the "ticket" or discussions invitation token, the one or more "rooms," i.e., discussions such as, for example, the social forum or the social group associated with the encoded information may not be searchable, discoverable, or otherwise accessible to the user. However, in other embodiments, the discussions invitation token is just one mechanism for providing access or membership to a social group or social forum.

Optionally, after the discussions imaging component 190-3 identifies the boundaries for each discussions invitation ticket image, the discussions imaging component 190-3 may be configured to crop, cut, or copy the portion of the discussions invitation ticket image comprising the machine-readable invitation signature and any features (e.g., image information within the predefined geometric shape) within the machine-readable invitation signature, so that the machine-readable invitation signature and any features within that machine-readable invitation signature are retained or kept while other features (e.g., image information not within the machine-readable invitation signature) in the image are deleted or otherwise removed. The discussions imaging component 190-3 may be further configured to provide the cropped, cut, or copied portion of one or more discussions invitation ticket images comprising substantially the machine-readable invitation signatures and the associated features within the machine-readable invitation signatures as a list of focused discussions invitation ticket images to the discussions token component 190-6 for further processing.

In some embodiments, the discussions imaging component 190-3 may be configured to recognize one or more discussion invitation tickets by utilizing one or more image processing, image recognition, image detection, and/or a machine vision components, modules, and/or libraries (e.g., one or more modules or components of Apple® Core Image library, one or more modules of the Open Source Computer Vision (Open CV), etc.). Moreover, the image processing, image recognition, image detection, and/or a machine vision image components, modules, and/or libraries may be further trained, configured, and/or modified to detect machine-readable invitation signature features (e.g., a predefined geometric shape having a predefined size, predefined border thickness, predefined range of colors) for forums and/or groups. In some embodiments, at least one of the machine-readable invitation signature features (e.g., predefined size, predefined range of colors, predefined border thickness, predefined geometric features, etc.) may trained, configured and/or modified to be ignored by the image processing, image recognitions, image detection, and/or a machine vision image components, modules, and/or libraries.

Additionally or alternatively, in some embodiments, at least a portion of the recognition of one or more discussions invitation tickets in one or more images may be performed by the social networking application 108 of the social networking system 101. In those embodiments, the mobile device may provide the at least a portion of the image information (e.g., image information 222 stored in image datastore 220 further discussed with respect to FIG. 2D) to the social networking application 108 of the social networking system 101, where the social networking application 108 may be configured to perform at least a portion of the recognition of discussions invitation tickets and provide the list of discussions invitation ticket images, where each discussions invitation ticket image comprises at least one machine-readable invitation signature, the list of boundary information for each discussions invitation ticket image, and/or the list of focused discussions invitation ticket images to the discussions token component 190-6 via social networking communications component 110-2 for further processing.

The discussions token component 190-6 may be generally arranged to recognize machine-readable invitation tokens by analyzing, detecting, and/or decoding the detected machine-readable invitation tokens, where the machine-readable invitation token may be arranged to encode any information, which may include, but is not limited to, textual information, image information, audio information, video information, or any other information. In some embodiments, the machine-readable invitation token may include, but is not limited to, an optical machine-readable invitation token such as, for example, an N-dimensional barcode embedded within one or more images. The N-dimensional barcode may include, but is not limited, to one-dimensional barcode (e.g. Universal Product Code (UPC), etc.), two-dimensional barcode (e.g., data matrix barcode, Quick Response (QR) code, PDF417 barcode, CrontoSign color code, High Capacity Color Barcode (HCCB), etc.), or any other N-dimensional barcode that may be configured to encode any information.

In some embodiments, the machine-readable invitation token may be configured to encoded information associated with discussions (e.g., one or more forums and/or one or more groups). In those embodiments, the discussions token component 190-6 may be configured to recognize one or more machine-readable invitation tokens in the list of discussions invitation ticket images, where at least one discussions invitation ticket image in the list of discussions invitation ticket images may include at least one machine-readable invitation token. Moreover, the discussions token component 190-6 may be configured to recognize the machine-readable invitation token by at least analyzing the one or more discussions invitation ticket images in the list of discussions invitation ticket images and detecting one or more machine-readable invitation tokens within a region defined by the machine-readable invitation signature (e.g., the region may include an area within a predefined geometric shape for forums and/or groups) in the one or more discussions invitation ticket images.

To improve efficiency of analyzing and/or detecting machine-readable invitation tokens, in embodiments where the boundary information for a discussions invitation ticket image comprising the machine-readable invitation signature is provided by the discussions imaging component 190-3 and/or social networking application 108 to the discussions token component 190-6, the discussions token component 190-6 may be further configured to analyze and detect the machine-readable invitation tokens within the boundary of the machine-readable invitation signature represented by the boundary information for each discussions invitation ticket image. Additionally or alternatively, in embodiments where the list of focused discussions invitation ticket images are provided to the discussions token component 190-6, the discussions token component 190-6 may be configured to analyze and detect the machine-readable invitation tokens in the focused discussions invitation ticket image.

After recognizing at least one machine-readable invitation token in a discussions invitation ticket image or a focused discussions invitation ticket image, the discussions token component 190-6 may be configured to decode the machine-readable invitation token and provide decoded token information encoded in each machine-readable invitation token to the discussions management component 190-1 as a list of decoded token information.

In some embodiments, the decoded token information may be associated with one or more discussions (e.g., one or more social forums and/or one or more social groups). Furthermore, in those embodiments, the decoded token information may include, but is not limited to, a discussions invitation token, such as, for example, an alphanumeric value and/or URIs/URLs (e.g., https://www.discussions.com/socialgroupinvite/02393hahfh0a3, https://www.discussions.com/socialforuminvite/490853soahadohfa, https://www.discussions.com/socialdiscussioninvite/adfalku38243, etc.), associated with the one or more social forums and/or social groups that provide a "ticket" to enable a user having an associated user account and user profile to access or become a member of one or more "rooms," i.e., discussions (e.g., one or more social forums and/or one or more social groups) in the social networking system 101. Moreover, in some embodiments, absent of the "ticket" or discussions invitation token, the one or more "rooms," i.e., discussions such as, for example, the social forum or the social group associated with the encoded information may not be searchable, discoverable, or otherwise accessible to the user. However, it other embodiments, the discussions invitation token is just one mechanism for providing access or membership to a social group or social forum.

In some embodiments, the discussions token component 190-6 may be configured to automatically recognize by analyzing, detecting, and/or decoding one or more machine-readable invitation tokens in one or more discussions invitation ticket images or focused discussions invitation ticket images by utilizing one or more machine-readable invitation token recognition and decoding components, modules, and/or libraries (e.g., one or more modules of ZXing library, one or more modules of the Apple® AVFoundation, etc.). Moreover, the one or more machine-readable invitation token recognition and decoding components, modules, and/or libraries may be trained, configured, and/or modified to recognize and decode a predefined machine-readable invitation token (e.g., a QR code) within each discussions invitation ticket image or focused discussions invitation ticket image.

Additionally or alternatively, in some embodiments, at least a portion of the recognition of a machine-readable invitation token may be performed by social networking application 108 of the social networking system 101. In those embodiments, mobile discussions application 124-1-1 of the mobile device 102-1 may optionally provide the at least a portion of the list of discussions invitation ticket images, list of boundary information, and/or list of focused discussions invitation ticket images to the social networking application 108 of the social networking system 101 for recognition. However, it may be appreciated that the list of discussions invitation ticket images, list of boundary information, and/or list of focused discussions invitation ticket images, may not be transmitted to the social networking application 108, when the list of discussions invitation ticket images, list of boundary information, and/or list of focused discussions invitation ticket images may already be stored or otherwise available in the social networking system 101, such as for example, when the social networking application 108 may be configured to perform at least a portion of discussions invitation ticket recognition in one or more images as discussed.

In some embodiments, the discussions token component 190-6 may also be configured to create or generate one or more machine-readable invitation tokens to be superimposed, overlaid, embedded, or otherwise incorporated in one or more rendered discussions invitation ticket images by utilizing one or more encoding components, modules, and/or libraries (e.g., one or more modules of ZXing library, etc.). In some embodiments, the discussions token component 190-6 may be configured to create or generate one or more machine-readable invitation tokens as an N-dimensional barcode based at least partially on social forum information and/or social group information. In some embodiments, the N-dimensional barcode may be configured to encode discussions invitation tokens (e.g., an alphanumeric values and/or URIs/URLs) associated with one or more social forums and/or social groups in the social networking system 101, where each discussions invitation token may be configured to enable access to the associated social forums and/or social groups for one or more users. Additionally or alternatively, in some embodiments, the social networking application 108 of the social networking system 101 may also be configured to create or generate the one or more machine-readable invitation tokens based at least partially on the social forum and/or the social group provided by the discussions token component 190-6.

The discussions rendering component 190-2 may be generally arranged to provide visual display information comprising to the touch sensitive display component 182 to render one or more UI views comprising one or more UI elements for visual presentation on the display device 168. In some embodiments, the discussions rendering component 190-2 may be further arranged to provide visual display information to the touch sensitive display component 182 to render one or more animated transitions between the one or more views and/or one or more animated UI elements for visual presentation on the display device 168.

In some embodiments, the discussions rendering component 190-2 may be configured to render transition animations between one or more views. In particular, the discussions rendering component 190-2 may be configured to render a transition animation when mobile discussions application 124-1-1 transitions from a discussions UI view (e.g., discussions UI view 300 of FIG. 3A-3B or discussions UI view 300 of FIG. 3C-3D) to a discussion UI view (e.g., discussion UI view 400 of FIG. 4A or discussion UI view 450 of FIG. 4B) for a particular social forum or forum group. The discussions rendering component 190-2 may also be configured to render a transition animation when mobile discussions application 124-1-1 transitions from a discussion UI view (e.g., discussion UI view 400 of FIG. 4A or discussion UI view 450 of FIG. 4B) for a particular social forum or forum group to a discussions UI view (e.g., discussions UI view 300 of FIG. 3A-3B or discussions UI view 350 of FIG. 3C-3D).

In some embodiments, the discussions rendering component 190-2 may be configured to render one or more discussions invitation ticket images comprising at least one machine-readable invitation token based at least partially on social forum information and/or social group information associated with a social forum and/or social group. In one embodiment, the rendering component may be configured to render a discussions invitation ticket image for a social forum which may include, but is not limited to, a machine-readable invitation signature having one or more machine readable signature features which may include, but is not limited to a predefined geometric shape (e.g., circular shape), a predefined size (e.g., a radius of at least 300 pixels), a predefined border thickness (e.g., a border thickness of at least 10 pixels), and/or a predefined range of colors (e.g., a range of colors comprising shades of red colors), a portion of a discussions invitation image (e.g., a portion of the forum cover image representative of forum cover image information modified or configured to fit within the region defined by the geometric shape for forums), forum name information (e.g., the forum name), a machine-readable invitation token (e.g., a quick response barcode) configured to encode discussions invitation tokens associated with the social forum, or any other social forum information.

In some embodiments, the rendering component may also be configured to render discussions invitation ticket image for a social group which may include, but is not limited to, a machine-readable invitation signature having one or more machine-readable invitation signature features (e.g., a predefined geometric shape having a predefined size, predefined border thickness, and/or a predefined range of colors), a portion of a discussions invitation image (e.g., a portion of the group cover image representative of group cover image information modified or configured to fit within the region defined by the geometric shape for groups), group name information (e.g., the group name), a machine-readable invitation token (e.g., a quick response barcode) configured to encode discussions invitation tokens associated with the social group, or any other social group information.

It may be appreciated that in some embodiments, the discussions invitation ticket image may be rendered using a user selected image (e.g., an image selected from image datastore 220 of FIG. 2D) instead of the forum cover image or group cover image of a social group or a social forum, where the user selected image may be further modified to fit within the region defined by the geometric shape for forums or groups.

In some embodiments, discussions rendering component 190-2 may be configured to render the one or more discussions invitation ticket images utilizing one or more image processing, image overlay modules, and/or libraries (e.g., one or more modules of ZXing library, etc.). In some embodiments, the discussions rendering component 190-2 may be further configured to overlay at least one machine-readable invitation token created or generated by the discussions token component 190-6 or social networking application 108 of the social networking system 101 within the discussions invitation ticket image. Additionally or alternatively, in some embodiments, at least a portion of the rendering of the one or more discussions invitation ticket images and/or overlaying of machine-readable invitation token within the one or more discussions invitation ticket images may be performed by one or more components 110-*c* (e.g., social networking management 110-1) of the social networking system 101.

The discussions input component 190-4 may be generally arranged to provide user input information which may include, but is not limited to, one or more gestures and provide character input information utilizing one or more components of the mobile device 102-1 (e.g., touch sensitive display component 182). In some embodiments, the discussions input component 190-4 may be configured to receive touch input information from the touch sensitive display component 182 and determine one or more finger gestures based at least partially on the received touch input information. In some embodiments, the discussions input component 190-4 may be configured to provide user input information including the character input information to the based on one or more characters inputted by a user utilizing an on-screen virtual keyboard visually presented on at least a portion of the display device 168. Moreover, the character input information may be determined based at least partially on one or more contacts detected in a predefined region associated with the on-screen virtual keyboard.

In some embodiments, the discussions input component 190-4 may be further configured to detect a selection finger gesture to select a selectable UI element based at least partially on the received touch input information, the received touched input information may include, but is not limited to, finger contact at a first location in a predefined region associated with the UI element visually presented on the display device 168 for a predefined time period (e.g., less than one second), and termination of the finger contact at the first location of the predefined region.

In some embodiments, the discussions input component 190-4 may be also configured to detect a scroll finger gesture to scroll a scrollable UI element and/or scrollable UI view based at least partially on the received touch input information, the received touched input information may include, but is not limited to, finger contact at a first location in a predefined region associated with the scrollable UI element and/or scrollable UI view visually presented on the display device 168, initiating movement of the finger contact within a predefined time period after the finger contact (e.g., less than one second), continuous movement of the finger contact from the first location to a second location in at least one direction (e.g., up direction, down direction, left direction, right direction, or any combination thereof), and termination of the finger contact at the second location.

It may be appreciated that in some embodiments, UI elements and/or UI views may be configured as selectable and/or scrollable, and the discussions input component 190-4 may be configured to determine the respective finger gesture based at least partially on the received touch input information.

The discussions settings component 190-8 may be generally arranged to manage the settings associated with the mobile discussions application 124-1-1 utilizing one or more components of the mobile device 102-1 (e.g., touch sensitive display component 182, storage component 150, etc.). In some embodiments, the discussions settings component 190-8 may be configured to modify and/or update user mobile discussions application preferences information stored or cached in storage component 150 and/or system memory 120, based at least partially on user input information provided by the discussions input component 190-4.

In some embodiments, the discussions settings component 190-8 may be configured to modify, update, and/or otherwise synchronize the user mobile discussions application preferences information stored or cached in storage component 150 and/or system memory 120 with the user mobile discussions application preferences information stored in the social networking system 101, so that any instance of the mobile discussions applications 124-*a*-1 for a user having an associated user account and user profile information may share and/or utilize the latest user mobile discussions application preferences information regardless of which mobile device the user is currently using.

The discussions management component 190-1 be generally arranged to enable the association and management of one or more discussions (e.g., one or more groups and/or one or more forums) in the social networking system 101 by a user having an associated user account and user profile. To provide the association and management of one or more discussions in the social networking system 101, the discussions management component 190-1 may be further arranged to request at least a portion of information (e.g., at least a portion of user profile information, social groups information, social forum information, etc.) stored in the social networking system 101 from the social networking application 108, receive the requested portion of information from the social networking application 108, store or cache the received portion of information in system memory 120 and/or storage component 150, provide the stored or cached information to the discussions rendering component 190-2 for visual presentation in one or more UI views, receive user input information to add, remove, append, and/or otherwise modify at least a portion of the stored or cached information, and provide at least a portion updated stored or cached information to the social networking application 108.

In some embodiments, after the successful authentication of the user by the discussion authentication component 190-7 and receipt of the one or more time limited access tokens from the social networking application 108, the groups management component 190-1 may initiate one or more requests for information 192 associated with the user having the associated user account and user profile via the discussions communications component 190-5.

In some embodiments, the discussions management component 190-1 may be configured to request user forum membership information associated with the user having the associated user account and receive the requested user forum membership information from the social networking management component 110-1 associated with the user. Once the user forum membership information associated with the user is received, the discussions management component 190-1 may be further configured to request and receive at least a portion of user social forum information (e.g., at least a portion of the forum cover image information, forum name information, etc.) from the social networking management component 110-1 for each forum the user is a member of based at least partially on the forum identifier information of the user forum membership information. The discussions management component 190-1 may be further configured to provide, among other information, the received social forum information for each forum the user is a member of to the discussions rendering component 190-2 for visual presentation in one or more UI views (e.g., discussions UI views 300 and 350 of FIGS. 3A-3D, discussion UI views 400 and 450 of FIG. 4A-4B, etc.).

In addition or alternative to requesting user forum membership information, in some embodiments, the discussions management component 190-1 may be configured to request user group membership information associated with the user having the associated user account and receive the requested user group membership information from the social networking management component 110-1 associated with the user. Once the user group membership information associated with the user is received, the discussions management component 190-1 may be further configured to request and receive at least a portion of social group information (e.g., at least a portion of the group cover image information, group name information, etc.) from the social networking management component 110-1 for each group the user is a member of based at least partially on the group identifier information of the user group membership information. The discussions management component 190-1 may be further configured to provide, among other information, the received social group information for each group the user is a member of to the discussions rendering component 190-2 for visual presentation in one or more UI views (e.g., discussions UI views 300 and 350 of FIGS. 3A-3D, discussion UI views 400 and 450 of FIG. 4A-4B, etc.).

In some embodiments, the discussions management component 190-1 may be configured to request the user of the mobile discussions application 124-1-1 having the associated user account for access to at least a portion of an image datastore (e.g., image datastore 220 further discussed with respect to FIG. 2D), in response to the mobile discussions application 124-1-1 transitioning from a non-execution state to the foreground state for the first time.

By way of example, the discussions management component 190-1 may be configured to request, via a modal access request dialog UI element (not shown) visually presented on a touch sensitive display screen (e.g., touch sensitive display screen 310 of FIG. 3A-3D, FIG. 4A-4B, and/or FIG. 5A-5B) of the display device 168, access to the image datastore. Moreover, the access request modal dialog UI element may comprise selectable options UI elements (not shown) to enable the user to select whether to allow or deny the mobile discussions application 124-1-1 access to the image datastore (e.g., image datastore 220 of FIG. 2D). In some embodiments, once the user allows the mobile discussions application 124-1-1 access to the image datastore, the mobile discussions application 124-1-1 may be configured to save or store the selection as image datastore access information so that the selection of the user to allow the mobile discussions application 124-1-1 to access image datastore may persist on at least the mobile device 102-1.

In some embodiments, the discussions management component 190-1 may be configured to automatically request the discussions imaging component 190-3 to initiate a scan of at least a portion of the image datastore to recognize one or more images comprising one or more discussions invitation tickets, where each discussions invitation ticket may include, but is not limited to, a machine-readable invitation signature and/or machine-readable invitation token. In those embodiments, the discussions management component 190-1 may be configured to automatically request the discussions imaging component 190-3 to initiate the scan based at least partially on the image datastore access information and the transition of the mobile discussions application 124-1-1 between and among the one or more execution states. More specifically, the discussions management component 190-1 may be configured to automatically request the discussions imaging component 190-3 to initiate the scan of at least a portion of the image datastore, in response to the mobile discussions application 124-1-1 transitioning from a non-foreground state (e.g., background state, suspended state, non-execution state, etc.) to the foreground state and the image datastore access information indicates that the user allows mobile discussions application 124-1-1 access to the image datastore.

By way of an example, the discussions management component 190-1 may be configured to automatically request the discussions imaging component 190-3 to initiate the scan, in response to a user of the mobile device 102-1 and/or one or more mobile applications 124-1-b launching the mobile discussions application 124-1-1 and the image datastore access information indicates that the user allows the mobile discussions application 124-1-1 access to the image datastore.

By way of another example, the discussions management component 190-1 may be configured to automatically request the discussions imaging component 190-3 to initiate the scan, in response to a user and/or one or more mobile applications 124-1-b of the mobile device 102-1 switching from a different application (e.g., browser application 124-1-8, imaging application 124-1-3, messaging application 124-1-4, e-mail application 124-1-6, social application 124-1-9, etc.) to the mobile discussions application 124-1-1 previously suspended from execution on the mobile device 102-1 and the image datastore access information indicates that the user allows the mobile discussions application 124-1-1 access to the image datastore.

By way of a further example, the discussions management component 190-1 may be configured to automatically request the discussions imaging component 190-3 to initiate the scan, in response to a user and/or one or more mobile applications 124-1-b of the mobile device 102-1 switching from a different application (e.g., browser application 124-1-8, imaging application 124-1-3, messaging application 124-1-4, e-mail application 124-1-6, social application 124-1-9, etc.) to the mobile discussions application 124-1-1 previously executing in the background on the mobile device 102-1 (e.g., executing in the background to receive real time push updates for one or more discussions and/or groups, etc.) and the image datastore access information indicates that the user allows the mobile discussions application 124-1-1 access to the image datastore.

In some embodiments, in addition to automatically initiating a scan when transitioning between and among execution states, the discussions management component 190-1 may be further configured to automatically request the discussions imaging component 190-3 to initiate the scan of the image datastore periodically (e.g., every 5 minutes, 10 minutes, 15, minutes, 30 minutes, 60 minutes, etc.) and the image datastore access information indicates that the user allows the mobile discussions application 124-1-1 access to the image datastore. Moreover, the periodic automatic scanning of the image datastore discussions management component 190-1 may configured to be performed while the mobile discussions application 124-1-1 is in the foreground state and/or in the background state.

In some embodiments, in addition to automatically initiating a scan when transitioning between and among execution states and automatically initiating the scan on a periodic basis, the discussions management component 190-1 may be further configured to automatically request the discussions imaging component 190-3 to initiate the scan of the image datastore, in response to one or more events received from operating system 122-1 and/or one or more applications 124-1-b indicating an update to the image information stored in the image datastore. Additionally or alternatively, the discussions management component 190-1 may be further configured to automatically request the discussions imaging component 190-3 initiate the scan, in response a user requesting the capture of one or more images and storing the one or more captured images as image information in image datastore utilizing one or more image capture UI views (e.g., image capture UI view 500 further discussed with respect to FIG. 5A or image capture UI view 550 further discussed with respect to FIG. 5B).

In some embodiments, after recognizing one or more discussions invitation tickets, the discussions management component 190-1 may be configured to receive the list of decoded token information and where each decoded token information in the list of decoded token information may comprise a discussions invitation token configured to provide access and/or membership to a social forum or a social group. Moreover, the discussions invitation token may enable the user having the associated user account and user profile access to at least a portion of the social forum information or social group information associated with the social forum or the social group. To provide access to at least a portion of the social forum information or social group information, the discussions management component 190-1 may be further configured to automatically request and receive, from the social networking system 101, at least a portion of social forum information and/or social group information the discussions invitation token is configured to provide access to and provide at least a portion of the received social forum information and/or social group information to the discussions rendering component 190-2 for visual presentation in one or more UI views (e.g., discussions UI views 300 and 350, of FIG. 3A-3D and/or discussion UI views 400 and 450 of FIG. 4A-4B) on a touch sensitive display screen (e.g., touch sensitive display screen 310 of FIG. 3A-3D, FIG. 4A-4B, and FIG. 5A-5B) of display device 168.

In some embodiments, the discussions management component 190-1 may be configured to provide one or more discussions management functions, which may include, but is not limited to, creating one or more forums and/or one or more groups, suggesting the creation of forums and/or one or more groups, sharing one or more forums and/or one or more groups, leaving one or more forums/one or more groups, joining one or more forums and/or one or more groups, inviting one or more users to join as forum members and/or group members.

In some embodiments, the discussions management component 190-1 may be configured to create one or more forums in the social networking system 101 by receiving user input information during the visual presentation of one or more UI views to create a new forum, where the received user input information may include, but is not limited to, forum creation configuration information. The forum creation configuration information may include, but is not limited to, at least a portion of the social forum information (e.g., forum name information, forum description information, forum cover image information), during the visual presentation of one or more forum creation UI views (not shown), and requesting the social networking application 108 to create of the new forum based on the forum creation configuration information and user identifier information associated with the user creating the new forum.

In addition or alternative to the creation of one or more forums, in some embodiments, the discussions management component 190-1 may be configured to create one or more groups in the social networking system 101 by receiving user input information during the visual presentation of one or more UI views to create a new group, where the received user input information may include, but is not limited to, group creation configuration information. The group creation configuration information may include, but is not limited to, at least a portion of the social group information (e.g., group privacy information, group name information, group description information, group cover image information), during the visual presentation of one or more group creation UI views (not shown), and requesting the social networking application 108 to create of the new group based on the group creation configuration information and user identifier information associated with the user creating the new group.

In some embodiments, the discussions management component 190-1 may further enable a user, who may be a forum member of a forum, to invite one or more users that may or may not be socially connected to the user to join the forum as a forum member of the forum. The discussions management component 190-1 may send one or more rendered discussions invitation ticket images which may include, but is not limited to, a discussions invitation ticket, where the discussions invitation ticket may include, but is not limited to, a machine-readable invitation signature having one or more machine-readable invitation signature features for forums, at least a portion of the discussions invitation image (e.g., forum cover image representative of forum cover image information, etc.), forum name information, machine-readable invitation token comprising the discussion invitation token, user instructions information (e.g., plain language instructions to utilize the discussions invitation ticket), discussions reference information (e.g., a URI/URL associated with the social networking system managing the discussions and/or groups), or any other social forum information. It may be appreciated that, in some embodiments, instead of rendering the discussions invitation ticket for inviting the one or more users to join the forum using the forum cover image of the forum, the user may select and/or capture their own image (e.g., selecting an image from image datastore 220 of mobile device 102-1 or capturing an image using the discussions imaging component 190-3), so that the rendered discussions invitation ticket image for inviting one or more users to join the forum may comprise the user selected or user captured image modified to fit within the machine-readable invitation signature of the discussions invitation ticket.

In addition or alternative to inviting one or more users to become forum members of a forum, in some embodiments, the discussions management component 190-1 may further enable a user, who may be a group member, to invite one or more users that may or may not be socially connected to the user to join a group as a group member of the group. The discussions management component 190-1 may send one or more rendered discussions invitation ticket images which may include, but is not limited to, a discussions invitation ticket, where the discussions invitation ticket may include, but is not limited to, a machine-readable invitation signature having one or more machine-readable invitation signature features for a group, at least a portion of the discussions invitation image (e.g., group cover image representative of group cover image information), group name information, machine-readable invitation token comprising the discussion invitation token, or any other social group information. Additionally, in some embodiments, the user may select or capture their own image (e.g., selecting an image from image datastore 220 of mobile device 102-1 or capturing an image using the discussions imaging component 190-3) instead of the group cover image, so that the rendered discussions invitation ticket image for inviting one or more users to join the group may comprise the user selected image modified to fit within the machine-readable invitation signature of the discussions invitation ticket.

In some embodiments, the discussions invitation ticket may optionally further include a selectable reference (e.g., a URI/URL, deep link reference, etc.) to enable the invitation ticket recipient using a different mobile device (e.g., mobile device 102-2) to request a transition their instance of the mobile discussions application (e.g., mobile discussions application 124-2-1 of mobile device 102-2) from a non-foreground state to the foreground state by switching from one or more applications (e.g., e-mail application 124-2-6, messaging application 124-2-4, imaging application 124-2-3, browser application 124-2-8, social application 124-1-9, etc.) executing in the foreground on the different mobile device (e.g., mobile device 102-2) to their instance of the mobile discussions application (e.g., mobile discussions application 124-2-1 of mobile device 102-2). The mobile discussions application (e.g., mobile device 102-2) may be further configured to automatically navigate to the discussions UI view (e.g., discussions UI view 300 of FIG. 3A-3B or discussions UI view 350 of FIG. 3C-3D), in response to a transition of the mobile discussions application from the non-foreground state to the foreground state when a user selects the selectable reference discussions invitation ticket.

In some embodiments, the discussions management component 190-1 may be further configured to share the discussions invitation ticket by transmitting or sending the discussions invitation ticket via the e-mail application 124-1-6 as an e-mail message, via the messaging application 124-1-4 as a multimedia message or social message, and/or via any other application 124-1-*b* configured for sending and/or receiving messages to one or more discussions invitation ticket recipients. In addition to sharing by transmitting the discussions invitation ticket via one or more applications 124-1-*b* discussed above, the discussions invitation ticket may also be shared on one or more websites by uploading the discussions invitation ticket to one or more social networking websites (e.g., Twitter®, Vine®, Facebook®, Reddit®, Digg®, Imgur®, etc.). Furthermore, the discussions invitation ticket may be shared by printing the discussions invitation ticket on a physical medium (e.g., a poster).

Once the recipient user receives and stores the discussions invitation ticket image comprising the discussions invitation ticket on their mobile device (e.g., mobile device 102-2, mobile device 102-3 . . . mobile device 102-*a*, etc.) via one or more electronic messages, electronic images, physical mediums (e.g., capturing the current visual presentation on the display device 168, capturing an image using the imaging application 124-1-1, etc.) in an image datastore (e.g., image datastore 220 of FIG. 2D) utilizing operating system and/or one or more applications executing on their mobile device, the mobile discussions application of their mobile device (e.g., mobile discussions application 124-2-1 of mobile device 102-2) may automatically scan the image datastore to recognize one or more discussions invitation tickets that may provide access and/or membership to a social forum or social group.

FIG. 2A-2C illustrate exemplary embodiments in operating environment 200 of image information 222 stored in an image datastore 220 to access and/or join a discussion (e.g., a forum or a group). As illustrated in FIG. 2A, the operating environment 200 may comprise an image datastore 220, which may reside in system memory 120 and/or storage component 150 of a mobile device (e.g., mobile device 102-1, mobile device 102-2 . . . mobile device 102-a, etc.) and may be configured to store image information 222. The image information 222, may comprise one or more images 210-f (e.g., image 210-1, 210-2, 210-3 . . . 210-f, etc.), which may be stored in one or more image containers and scanned by the discussions imaging component 190-3 in order to recognize one or more discussions invitation tickets (e.g., a discussions invitation ticket 230-1 for a forum).

In the exemplary embodiment illustrated in operating environment 200 of FIG. 2A, image 210-1 may comprise a discussions invitation ticket 230-1 for a forum. The discussions invitation ticket 230-1 may include, but is not limited to, a machine-readable invitation signature 212-1 substantially enclosing or surrounding a machine-readable invitation token 214-1 (e.g., a square shaped QR code), at least a portion of a discussions invitation image 218-1, a forum name 216-1 (e.g., "Greek Art"), and/or any other social forum information. The machine-readable invitation signature 212-1 may include, but is not limited to, one or more machine-readable invitation signature features configured to enable the mobile discussions application 124-1-1 and/or the social networking application 108 to recognize the machine-readable invitation signature. The one or more machine-readable invitation signature features may include, but is not limited to, a circular shape, having a radius of 300 pixels, a border thickness of 10 pixels, and/or a range of colors comprising shades of dark colors for the forum. Furthermore, the discussions invitation ticket 230-1 may further include a machine-readable invitation token 214-1 to enable the discussions management component 190-1 of one or more mobile devices 102-a and/or one or more components 110-c of the social networking system 101 to automatically recognize, decode, and provide a user having an associated user account and user profile access to the forum having the forum name 216-1 "Greek Art."

In the exemplary embodiment illustrated in operating environment 200 of FIG. 2B, image 210-2 may comprise a discussions invitation ticket 230-2 for a forum. The discussions invitation ticket 230-2 may include, but is not limited to, a machine-readable invitation signature 212-2 substantially enclosing or surrounding a machine-readable invitation token 214-2 (e.g., a square shaped QR code), at least a portion of a discussions invitation image 218-2, a forum name 216-2 (e.g., "Abstract Art"), user instructions 230-2 (e.g., "Screenshot & open Mobile Discussions App"), discussions reference 232-2 (e.g., "http://discussions.com"), and/or any other social forum information. The machine-readable invitation signature 212-2 may include, but is not limited to, one or more machine-readable invitation signature features configured to enable the mobile discussions application 124-1-1 and/or the social networking application 108 to recognize the machine-readable invitation signature. The one or more machine-readable invitation signature features may include, but is not limited to, a square shape, having a radius of 300 pixels, a border thickness of 10 pixels, and/or a range of colors comprising shades of dark colors for the forum. Furthermore, the discussions invitation ticket 230-2 may further include a machine-readable invitation token 214-2 to enable the discussions management component 190-1 of one or more mobile devices 102-a and/or one or more components 110-c of the social networking system 101 to automatically recognize, decode, and provide a user having an associated user account and user profile access to the forum having the forum name 216-2 "Abstract Art."

In the exemplary embodiment illustrated in operating environment 200 of FIG. 2C, image 210-3 may comprise a discussions invitation ticket 230-3 for a forum. The discussions invitation ticket 230-2 may include, but is not limited to, a machine-readable invitation signature 212-3 substantially enclosing or surrounding a machine-readable invitation token 214-3 (e.g., a circular shaped QR code), at least a portion of a discussions invitation image 218-3, a forum name 216-3 (e.g., "Live music fuels the soul"), user instructions 230-3 (e.g., "Screenshot & open Mobile Discussions App to enter"), discussions reference 232-3 (e.g., "http://discussions.me"), and/or any other social forum information. The machine-readable invitation signature 212-3 may include, but is not limited to, one or more machine-readable invitation signature features configured to enable the mobile discussions application 124-1-1 and/or the social networking application 108 to recognize the machine-readable invitation signature. The one or more machine-readable invitation signature features may include, but is not limited to, a square shape, having a radius of 300 pixels, a border thickness of 10 pixels, a range of colors comprising shades of dark colors for the forum, geometric features 236-3-1 (e.g., one or more rounded corners on the square shape) and/or geometric features 236-3-2 (e.g., concave circular portions on edges of the square shape). Furthermore, the discussions invitation ticket 230-3 may further include a machine-readable invitation token 214-3 to enable the discussions management component 190-1 of one or more mobile devices 102-a and/or one or more components 110-c of the social networking system 101 to automatically recognize, decode, and provide a user having an associated user account and user profile access to the forum having the forum name 216-3 "Live music fuels the soul."

As illustrated in operating environment 200 of FIG. 2A-2C, at least one image (e.g., image 210-1) of the one or more images 210-f may comprise features or elements in addition to the one or more discussions invitation tickets (e.g., discussions invitation ticket 230-1). Moreover, the additional features or elements may be associated with UI elements and/or UI views of other applications 124-1-b when a discussions invitation ticket is received and captured via the other applications 124-1-b. Additionally or alternatively, the additional features or elements may be associated with physical objects in the real world when the at least one image (e.g., image 210-1) was captured via the image sensor 156 of the image capture component 154. It may be appreciated that the additional features or elements associated with other applications 124-1-b and/or physical objects in the real world are generally provided for purposes of illustration and may be ignored by the discussions imaging component 190-3, the discussions token component 190-6, and/or social networking application 108 of the social networking system 101, when recognizing one or more discussions invitation tickets in the one or more images 210-f.

It may also be appreciated that while operating environment 200 has been substantially discussed with respect to forums, discussions invitation tickets for groups may be similarly implemented as discussed with respect to discussions invitation ticket 230-1 for a forum. For example, with respect to discussions invitation ticket for a group, the machine-readable invitation signature 212-1 may include one or more machine-readable signature features, which may include, but is not limited to, a predefined geometric shape having a predefined size, predefined border thickness, predefined range of colors, and/or predefined geometric features, and the discussions invitation ticket for the group may include, but is not limited to, at least a portion of a group cover image or user selected image for the group, a group name for the group, and/or machine readable invitation token for enabling access and/or join the group. The embodiments are not limited in this context.

FIG. 2D illustrates an exemplary embodiment in operating environment 250 for accessing image information 222 stored in image datastore 220 by one or more applications 124-1-b of mobile device 102-1. As illustrated in operating environment 250, the operating system 122-1 and/or one or more applications 124-1-b of the mobile device 102-1 may be generally arranged to access (e.g., read, write, modify, append, remove, etc.) the image information 222 stored in the image datastore 220. For example, the operating system 122-1 and/or management application 124-1-2 may be arranged to capture images of one or more UI views of one or more applications 124-1-b executing in the foreground on the mobile device 102-1 and visually presented on display device 168 of the touch sensitive display component 182. The imaging application 124-1-3 may be generally arranged to capture images utilizing image capture component 154 of the mobile device 102-1. The messaging application 124-1-4 may be generally arranged to transmit and/or receive one or more multimedia messages and/or social network messages comprising one or more images utilizing the communications component 158. The e-mail application 124-1-6 may be generally arranged to send and/or receive one or more e-mails comprising one or more images as attachments or embedded within the e-mails utilizing the communications component 158. The browser application 124-1-8 may be generally arranged to transmit and/or receive one or more images associated with one or more websites utilizing the communications component 158. The social application 124-1-9 may be generally arranged to send and/or receive one or more images shared by the users of one or more social networking services. The operating system 122-1 and/or the one or more applications 124-1-b may be further arranged to store the captured and/or received images representative of image information 222 in one or more image containers, in response to a user of the mobile device 102-1 requesting to save the one or more captured images and/or received images, where at least one stored image may comprise, among other features or elements, a discussions invitation ticket (e.g., discussions invitation ticket 230-1).

Also illustrated in operating environment 250, the one or more components of the mobile discussions application 124-1-1 may be configured to access the image information 222 stored in the image datastore 220. In particular, the discussions rendering component 190-2 of the mobile discussions application 124-1-1 may be configured to render an image which may include, but is not limited to, a discussions invitation ticket (e.g., discussions invitation ticket 230-1 of FIG. 2A) for sharing discussions (e.g., one or more forums and/or one or more groups having the forum name "Greek Art" as illustrated in FIG. 2A) with one or more users. After the image comprising the discussions invitation ticket is rendered, the discussions rendering component 190-2 may be optionally configured to store the rendered image as image information 222 in one or more image containers in image datastore 220. It may be appreciated that the newly rendered image comprising the discussions invitation ticket, which may be configured to provide access and/or membership to a social forum or a social group and optionally stored in the image datastore 220, may be excluded from scanning by the discussions imaging component 190-3, when the user already has access to the social forum or the social group.

As further illustrated in operating environment 250 and after the one or more images representative of image information 222 are stored in the image datastore 220, the one or more components of the mobile discussions application 124-1-1, e.g., discussions management component 190-1, the discussions imaging component 190-3, and/or the discussions token component 190-6 may be configured to recognize one or more discussions invitation tickets in the one or more images by scanning, analyzing, detecting, and/or decoding the image information 222 stored in the image datastore 220. Additionally or alternatively, the discussions management component 190-1, the discussions imaging component 190-3, and/or the discussions token component 190-6, may be configured to transmit or provide at least a portion of the image information 222 to the social networking application 108 utilizing the discussions communications component 190-5, so that the social networking application 108 may recognize one or more discussions invitation tickets in the one or more images representative of image information 222.

Included herein are a set of UI views representative of exemplary user interfaces for performing at least a portion of the novel aspects of the disclosed architecture. The one or more UI views comprising one or more UI elements may be displayed or visually presented on a touch sensitive display screen (e.g., touch sensitive display screen 310 of FIG. 3A-3D, FIG. 4A-4B, and FIG. 5A-5B) of the display device 168. While, for purposes of simplicity of explanation, the one or more UI views shown herein, for example, may comprise the one or more UI elements generally arranged as shown in each of the UI views, it may be appreciated that the existence, type, position, font, text, size, color, images, shading, gradient, and/or any other attribute of the one or more UI elements may vary for each UI view of the one or more UI views. Moreover, not all UI views and/or UI elements illustrated herein may be needed for a novel implementation.

Figures 3A, 3B:
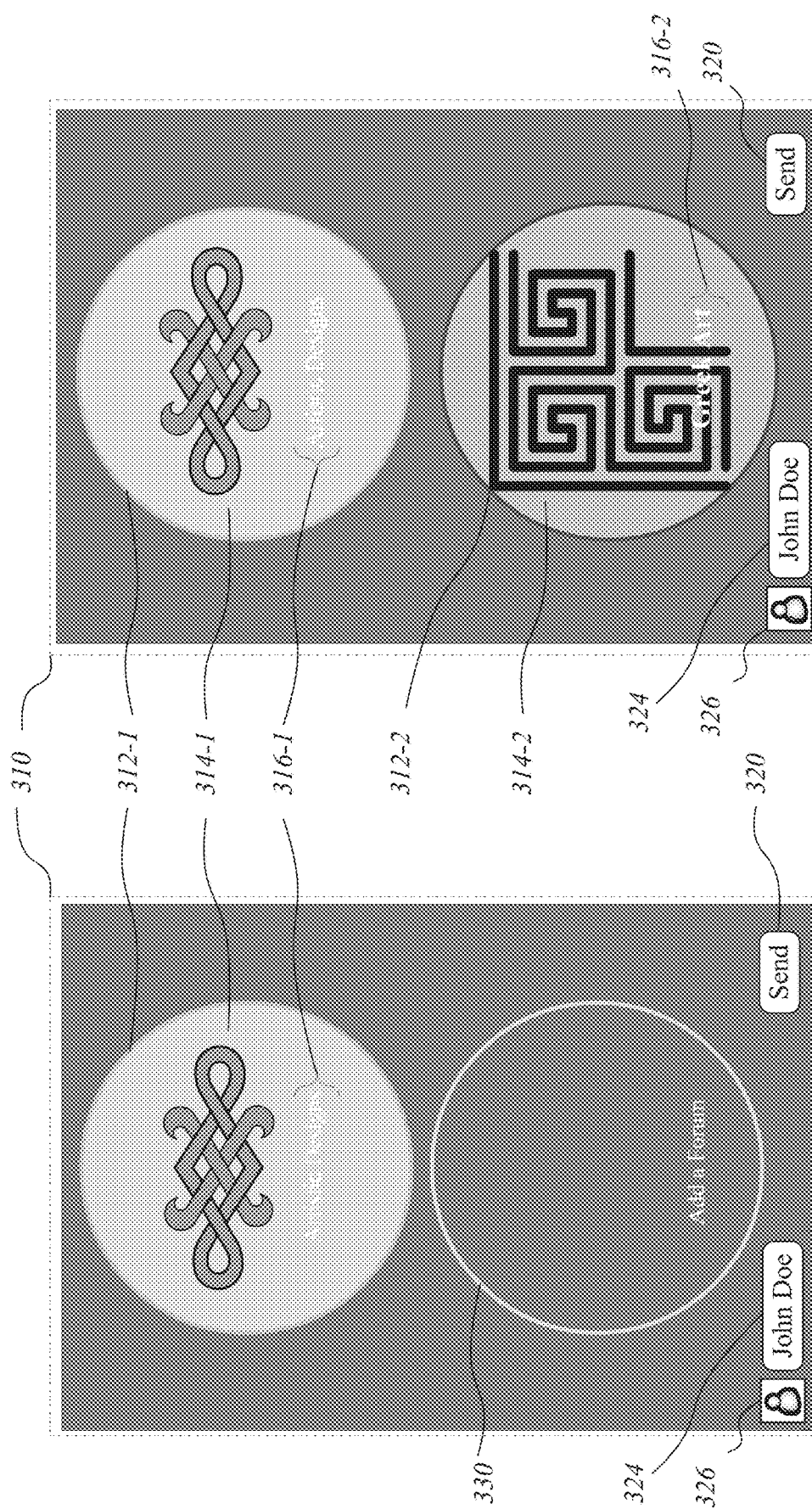
FIG. 3A-3D illustrate exemplary embodiments of discussions UI views.

FIG. 3A-3D illustrate exemplary embodiments of discussions UI views which may be configured as scrollable discussions UI views 300 and 350 for managing one or more discussions (e.g., one or more forums and/or one or more groups). As illustrated in FIG. 3A-3B, the scrollable discussions UI view 300 may be visually presented by the discussions rendering component 190-2 on a touch sensitive display screen 310 based at least partially on user forum membership information and/or user group membership information associated with a user having an associated user account and user profile in the social networking system 101.

In the exemplary embodiments of FIG. 3A-3B, the scrollable discussions UI view 300 may include, among other UI elements, a user profile UI element 318 for visually presenting at least a portion of user profile information. Moreover, the user profile UI element 322 may include, but is not limited to, a user profile image UI element 326 configured to visually present at least a portion of user profile media information (e.g., a profile image representative of the user) and a selectable user name UI element 324 configured to visually present user name information (e.g., user name "John Doe") of the user. The user may also select, via a selection finger gesture, the selectable user name UI element 324 to perform one or more management functions (e.g., updating at least a portion of the user profile information, etc.) by utilizing one or more UI elements and/or UI views (not shown).

In the exemplary embodiments of FIG. 3A-3B, the scrollable discussions UI view 300 may further include, but is not limited to, one or more selectable discussion UI elements 312-*g*, where each discussion UI element (e.g., discussion UI element 312-1, discussion UI element 312-2, etc.) may be representative of one or more discussions (e.g., one or more social forums and/or social groups). The scrollable discussions UI view 300 may be configured to visually present one or more selectable discussion UI elements 312-*g*, and may visual present additional discussion UI elements 312-*g* in the scrollable discussions UI view 300, in response to the user scrolling (e.g., scrolling down and/or scrolling up) the discussions UI view 300.

In the exemplary embodiments of FIG. 3A-3B, the discussions UI view 300 may include a selectable discussion UI element 312-1 representative of a forum or a group. In particular, the selectable discussion UI element 312-1 may be representative of a forum having the forum name "Artistic Designs" and may include, but is not limited to, discussion cover image UI element 314-1 configured to visually present at least a portion of forum cover image information (e.g., a focused portion of the forum cover image) for the forum and/or a discussion name UI element 316-1 to visually present forum name information (e.g., "Artistic Designs") for the forum.

In the exemplary embodiments of FIG. 3A-3B, the discussions UI view 300 may further include a selectable send UI element 320 to enable a user to share one or more discussions (e.g., one or more forums and/or one or more groups) with one or more users of different mobile devices (e.g., mobile device 102-2, etc.). Moreover, the selectable send UI element 320 may be configured to enable the user to select one or more discussions (e.g., forum named "Artistic Designs" represented by selectable discussion UI element 312-1, etc.) for sharing with another user of a different mobile device (e.g., mobile device 102-2) by rendering a discussions invitation ticket as an image for each selected discussion, and transmitting the rendered image comprising the discussions invitation ticket to the different mobile device via one or more applications 124-1-*a*.

As previously discussed, in some embodiments, the discussions invitation ticket may include, but is not limited to, a machine-readable invitation signature, a discussions invitation image, forum name or group name, and/or a machine-readable invitation token. The discussions invitation image may be forum cover image when the selected discussion is a forum or a group cover image when the selected discussion is a group. Additionally or alternatively, the discussions invitation image may be an image selected from the image datastore 220 or an image captured by the discussions imaging component 190-3 utilizing one or more image capture UI views. The machine-readable invitation token may be further configured to encode a discussions invitation token, where the discussions invitation token is associated with at least one social forum and/or at least one social group in the social networking system 101 and is configured to provide access and/or membership to the associated at least one social forum and/or at least one social group in the social networking system 101.

For example, the messaging application 124-1-4 may be configured to transmit a rendered image comprising a discussions invitation ticket as a multimedia message or social message to a user of mobile device 102-2. In another example, the e-mail application 124-1-6 may be configured to transmit a rendered image comprising a discussions invitation ticket as an e-mail to a user of mobile device 102-2. In still another example, the browser application 124-1-8 may be configured to upload a rendered image comprising a discussions invitation ticket on one or more web pages, where the one or more web pages may be viewable, accessible, or otherwise capable of being captured as an image by the mobile device 102-2. In a further example, the social application 124-1-9 of mobile device 102-1 may be configured to share a rendered image comprising a discussion invitation ticket with one or more users of one or more social networking services. In yet another example, the mobile discussions application 124-1-1 of mobile device 102-1 may be configured to transmit a rendered image to the social networking system 101 as one or more forum threads, posts, and/or comments, where a user of mobile device 102-2 may be configured to receive, view, access, capture, and/or store the image comprising the discussions invitation ticket as image information (e.g., image information 222 in image datastore 220 on mobile device 102-2) via the mobile discussions application 124-2-1 of mobile device 102-2.

Once the mobile discussions application 124-1-1 shares the one or more discussions by rendering one or more discussions invitation tickets as one or more images and transmitting the one or more images comprising the one or more discussions invitation tickets to the users of the different mobile devices, the different instances of the mobile discussions application (e.g., mobile discussions application 124-2-1, etc.), which may be similarly configured as mobile discussions application 124-1-1 on mobile device 102-1, may automatically recognize one or more discussions invitation tickets in the one or more images, after the user of the different mobile devices stores the one or more images comprising received discussions invitation tickets in the image datastore of the different mobile devices (e.g., image datastore 220 of mobile device 102-2, etc.).

In the exemplary embodiment of FIG. 3A, the discussions UI view 300 may include a selectable add discussion UI element 330 for enable a user to add a new forum or a new group for access in the mobile discussions application 124-1-1. Moreover, in the discussions UI view 300 of FIG. 3A, the discussions imaging component 190-3 may configure the discussions rendering component 190-2 to visually present an image capture UI view (e.g., image capture UI view 500 further discussed with respect to FIG. 5A or image capture UI view 550 further discussed with respect to FIG. 5B), in response to the user selecting selectable add discussion UI element 330. The image capture UI view may enable the user to capture and/or store an image comprising a discussions invitation ticket (e.g., discussions invitation ticket 230-1) and once the image is captured and/or stored in the image datastore 220, the discussions management component 190-1 may automatically request the discussions imaging component 190-3 to initiate the recognition of a discussions invitation ticket in order to provide the user access to the forum or the group associated with the discussions invitation ticket. Additionally or alternatively, the selectable discussion UI element 312-1 may also be configured to visually present one or more UI elements and/or UI views (not shown) to enable the user to select one or more image stored in the image datastore 220 for recognition of one or more discussions invitation tickets (e.g., discussions invitation ticket 230-1) in order to provide access to the one or more forums or one or more groups associated with the one or more discussions invitation tickets.

In the exemplary embodiment of FIG. 3B, the selectable discussion UI element 312-2, which may be representative of the forum having the forum name "Greek Art," may be automatically added by the discussions management component 190-1 of the mobile discussions application 124-1-1 as the selectable discussion UI element 312-2 in the discussions UI view 300 of FIG. 3B in order to provide access to the forum having the forum name "Greek Art." Similar to the selectable discussion UI element 312-1, the selectable discussion UI element 312-2 may also include, but is not limited to, discussion cover image UI element 314-2 configured to visually present at least a portion of forum cover image information (e.g., a focused portion of the forum cover image) for the forum having the forum name "Greek Art" and a discussion name UI element 316-2 to visually present forum name information, i.e., "Greek Art." Moreover, the discussions management component 190-1 of the mobile discussions application 124-1-1 may be configured to enable user access to the forum having the forum name "Greek Art" by adding the selectable discussion UI element 312-2 to the Discussions UI view 300, after the mobile discussions application 124-1-1 and/or the social networking application 108 recognizes the discussions invitation ticket (e.g., discussions invitation ticket 230-1) associated with the forum having the forum name "Greek Art" in one or more images representative of image information 222 and stored in image datastore 220.

Figures 3C, 3D:
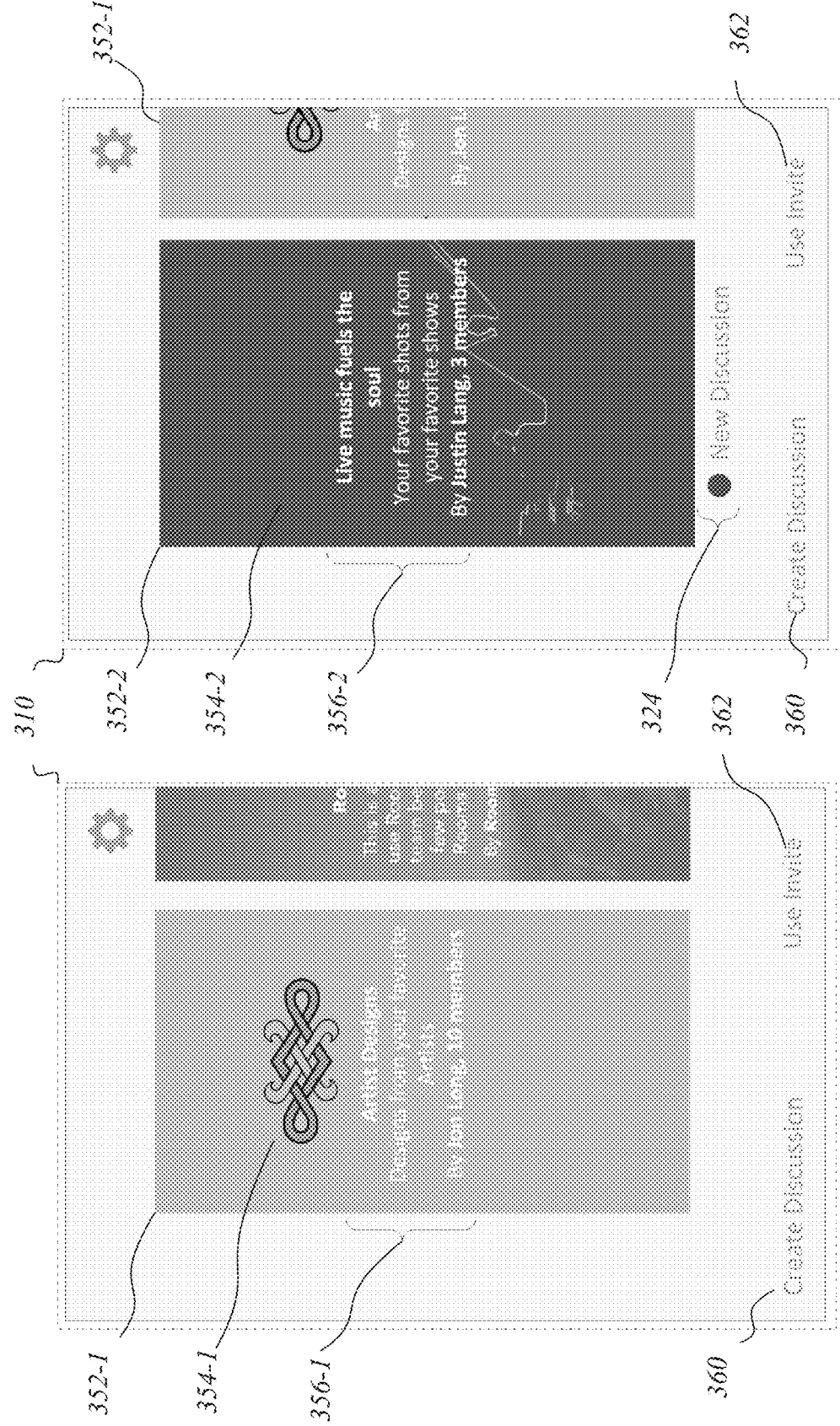

FIG. 3C-3D illustrates additional exemplary embodiments of the discussions UI view which may be a scrollable discussions UI view 350 for managing one or more discussions (e.g., one or more forums and/or one or more groups). Similar to the exemplary embodiments of FIG. 3A-3B, the scrollable discussions UI view 350 of FIG. 3C-3D may be visually presented by the discussions rendering component 190-2 on a touch sensitive display screen 310 based at least partially on user forum membership information and/or user group membership information associated with a user having an associated user account and user profile in the social networking system 101.

In the exemplary embodiments of FIG. 3C-3D, the scrollable discussions UI view 350 may further include, but is not limited to, one or more selectable discussion UI elements 352-i, where each selectable discussion UI element (e.g., selectable discussion UI element 352-1, etc.) may be representative of one or more discussions (e.g., one or more social forums and/or social groups). The scrollable discussions UI view 350 may be configured to visually present one or more selectable discussion UI elements 352-i, and may visual present additional selectable discussion UI elements 312-g in the scrollable discussions UI view 300, in response to the user scrolling (e.g., scrolling left and/or scrolling right) the discussions UI view 350.

In the exemplary embodiments of FIG. 3C-3D, the discussions UI view 350 may include a selectable discussion UI element 352-1 representative of a forum or a group. In particular, the selectable discussion UI element 352-1 may be representative of a forum having the forum name "Artistic Designs" and may include, but is not limited to, discussion cover image UI element 354-1 configured to visually present at least a portion of forum cover image information (e.g., a focused portion of the forum cover image) for the forum and/or a discussion information UI element 356-1 to visually present forum name information (e.g., "Artistic Designs"), forum description information (e.g., "Designs from your favorite Artists"), forum founder information (e.g., "Jon Long"), forum membership count information (e.g., "10 members") for the forum.

In the exemplary embodiments of FIG. 3C-3D, the scrollable discussions UI view 350 may further include, among other UI elements, a selectable create discussion UI element 360 for enabling a user to create a new discussion (e.g., a forum and/or groups) in the social networking system via the mobile discussions application 124-1-1. Moreover, in the discussions UI view 350 of FIG. 3C-3D, discussions management component 190-1 may configure the discussions rendering component 190-2 to visually present one or more UI views and/or UI elements (not shown) and receive at least a portion of forum configuration information or group configuration information via one or more UI views and/or UI elements, in response to the user selecting selectable create discussion UI element 360. Additionally, the discussions management component 190-1 may be configured to create a social forum or social group by communicating with social networking application 108 of the social networking system 101 based at least partially on the forum configuration information or the group configuration information.

In the exemplary embodiment of FIG. 3C-3D, the discussions UI view 350 may further include, among other UI elements, a selectable add discussion UI element 362 for enable a user to add a new forum or a new group by recognizing a discussions invitation ticket for accessing the new forum or new group in the mobile discussions application 124-1-1. Moreover, similar in operation to the selectable add discussion UI element 330 of discussions UI view 300, the discussions imaging component 190-3 may also configure the discussions rendering component 190-2 to visually present an image capture UI view (e.g., image capture UI view 550 further discussed with respect to FIG. 5B), in response to the user selecting selectable add discussion UI element 362 and assist the user in capturing one or more discussions invitation tickets.

In the exemplary embodiment of FIG. 3D, the selectable discussion UI element 352-2, which may be representative of the forum having the forum name "Live music fuels the soul," may be automatically added by the discussions management component 190-1 of the mobile discussions application 124-1-1 as the selectable discussion UI element 352-2 in the discussions UI view 350 of FIG. 3D in order to provide user having associated user account and user profile access to the forum having the forum name "Live music fuels the soul." Similar to the selectable discussion UI element 352-1, the selectable discussions UI element 352-2 may also include, but is not limited to, discussion cover image UI element 354-2 configured to visually present at least a portion of forum cover image information (e.g., a focused portion of the forum cover image) for the forum having the forum name "Live music fuels the soul" and a discussion information UI element 356-1 to visually present forum name information (e.g., "Live music fuels the soul"), forum description information (e.g., "Your favorite shots from your favorite shows"), forum founder information (e.g., "Justin Lang"), forum membership count information (e.g., "3 members"), and/or any other social forum information associated with the forum. Moreover, the discussions management component 190-1 of the mobile discussions application 124-1-1 may be configured to enable user access to the forum having the forum name "Live music fuels the soul" by adding the selectable discussion UI element 352-2 to the Discussions UI view 350, after the mobile discussions application 124-1-1 and/or the social networking application 108 recognizes the discussions invitation ticket (e.g., discussions invitation ticket 230-1) associated with the forum having the forum name "Live music fuels the soul" in one or more images representative of image information 222 and stored in image datastore 220.

In the exemplary embodiment of FIG. 3D, the discussions rendering component 190-2 may be further configured to present the newly added selectable discussion UI element 352-2 in a colored overlay having a predefined overlay color (e.g., a predefined color in the RGB color space encoded as a numerical value such as "0xFF0000" etc.), and a new discussion UI element 324 comprising a circular UI element having the same predefined overlay color to indicate to the user which selectable discussion UI elements 352-$i$ are newly added in the discussions UI view 350.

It may be appreciated that the selectable discussion UI elements 312-$g$ and 352-$i$ representative of a social forum or a social group visually presented in the discussions UI interviews 300 and 350 of FIG. 3A-3D, may be selected by the user (e.g., selected by using a selection finger gesture within the region defined by each selectable discussion UI element in one or more selectable discussion UI elements 312-$g$ or selectable discussion UI elements 352-$i$) and the discussions management component 190-1 of the mobile discussions application 124-1-1 may be configured to request and receive social forum information or social group information associated with a social forum or a social group, respectively, from the social networking application 108 of the social networking system 101, in response to the user selecting a selectable discussion UI element (e.g., selectable discussion UI element 312-2, selectable discussion UI element 352-2, etc.) representative of the forum or the group (e.g., forum having the forum name "Greek Art," forum having the forum name "Live music fuels the soul," etc.). After receiving the social forum information or social group information, the discussions management component 190-1, may be further configured to transition from the discussions UI view (e.g., discussions UI view 300 of FIG. 3A-3B or discussions UI view 350 of FIG. 3C-3D) to the discussion UI view (e.g., discussion UI view 400 of FIG. 4A or discussion UI view 450 of FIG. 4B) for a social forum or social group represented by the selectable discussion UI element that was selected. The discussions management component 190-1 may be further configured to visually present the received social forum information or social group information associated with the forum or the group in at least one discussion UI view (e.g., discussion UI view 400 of FIG. 4A or discussion UI view 450 of FIG. 4B) on the touch sensitive display screen 310.

Additionally or alternatively, after automatically recognizing a discussions invitation ticket for accessing and/or joining a forum or a group associated with the discussions invitation ticket and adding a selectable discussion UI element (e.g., selectable discussion UI element 312-2 or selectable discussion UI element 352-2) representative of the forum or group (e.g., the forum having the forum name "Greek Art" or "Live music fuels the soul"), the discussions management component 190-1 may be further configured to automatically request and receive social forum information or social group information associated with the newly added social forum or the group, and transition from the discussions UI view (e.g., discussions UI view 300 of FIG. 3A-3B or discussions UI view 350 of FIG. 3C-3D) to the discussion UI view (e.g., discussion UI view 400 of FIG. 4A or discussion UI view 450 of FIG. 4B) for the newly added social forum or social group. The discussions management component 190-1 may be further configured to automatically provide the received social forum information or the received social group information to the discussions rendering component 190-2 to be visually presented in at least one discussion UI view (e.g., discussion UI view 400 of FIG. 4A or discussion UI view 450 of FIG. 4B). It may be appreciated that the discussions rendering component 190-2 may be further configured to render a transition animation with the appearance of entering into the social forum and/or social group, when transitioning from the discussions UI view to the discussion UI view for a particular social forum or social group.

Figure 4B:
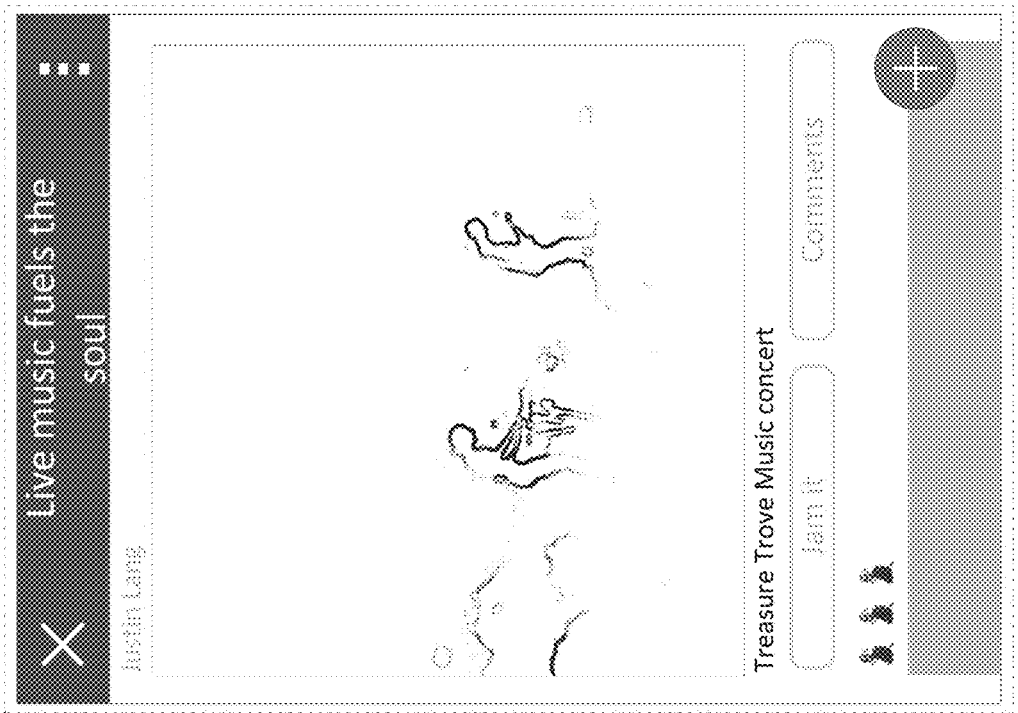
FIG. 4A-4B illustrate exemplary embodiments of a discussion UI views.
Figure 4A:
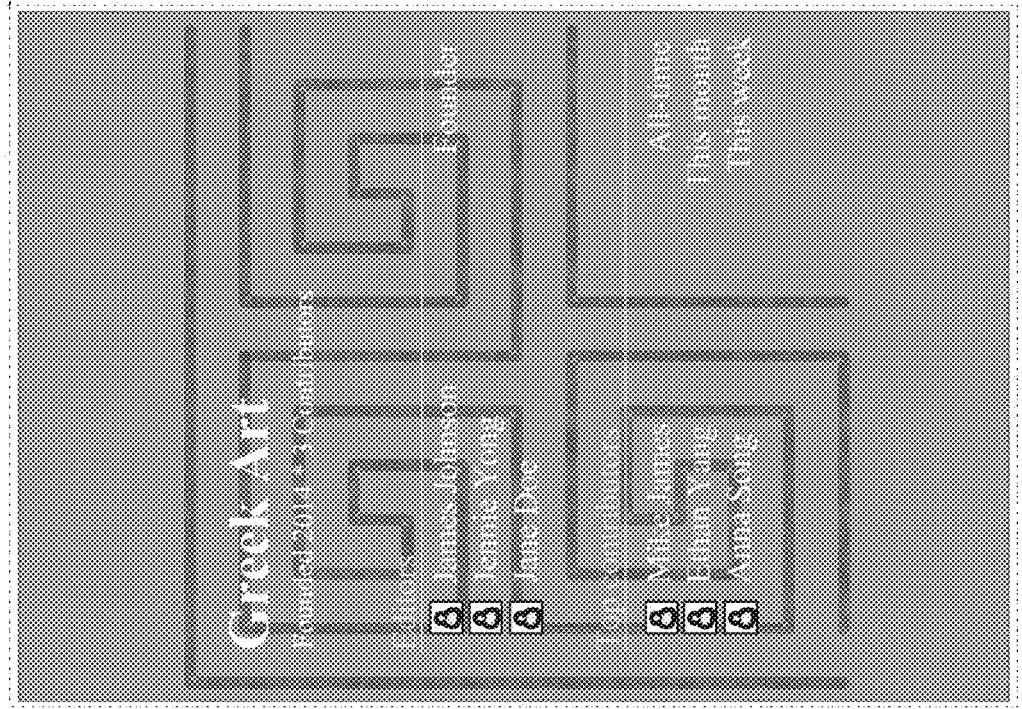

FIG. 4A-4B illustrate exemplary embodiments of discussion UI views 400 and 450. As illustrated in FIG. 4A-4B, the discussion UI views 400 and 450, which may be a scrollable discussion UI views 400 and 450, may visually present at least a portion of the social forum information, social group information, group discussion information, and/or forum discussion information on the touch sensitive display screen 310. In the exemplary embodiments of FIG. 4A-4B, the discussion UI views 400 and 450 may be visually presented after the user selects the one or more selectable discussion UI elements (e.g., selectable discussion UI element 312-2 or selectable discussion UI element 352-2) representative of one or more forums or one or more groups (e.g., the forum having the forum name "Greek Art" or forum having the forum name "Live music fuels the soul"). Additionally or alternatively, the discussion UI views 400 and 450 may also be visually presented after the discussions management component 190-1 adds the selectable discussion UI element (e.g., the selectable discussion UI element 312-2 or selectable UI element 352-2) by automatically recognizing one or more discussions invitation tickets in one or more images.

In the exemplary embodiment of FIG. 4A, the discussion UI view 400 may comprise one or more UI elements configured to visually present, among other social forum information, the forum name information (e.g., forum name "Greek Art," etc.) forum editor information (e.g., list of editors including, but not limited to, "James Johnson," "Jennie Yong," "Jane doe," etc.), forum founder information (e.g., name of the founder "James Johnson" and the year it was founded "2014," etc.), forum top contributors information (e.g., ranked list of top contributors in the forum "Mike James," Ethan Yang," "Anna Song,"), at least a portion of the forum cover image information, or any other information associated with one or more forums.

In the exemplary embodiment of FIG. 4B, the discussion UI view 450, which may be a scrollable discussion UI view 450, may visually present at forum name information (e.g., "Live music fuels the soul"), forum discussion information for one or more forum threads (e.g., forum thread posted by "Justin Lang" for the "Treasure Trove Music concert," an associated thread image, selectable UI elements for commenting etc.), or any other information associated with one or more forums.

It may be appreciated that while the exemplary embodiments of FIG. 4A-4B are substantially directed to social forum information, the discussion UI view 400 may be similarly configured to visually present at least a portion of the social group information, after the user selects the selectable discussion UI element representative of a group and/or after the discussions management component 190-1 adds a selectable discussion UI element representative of a group by automatically recognizing one or more discussions invitation tickets in one or more images.

Figure 5B:
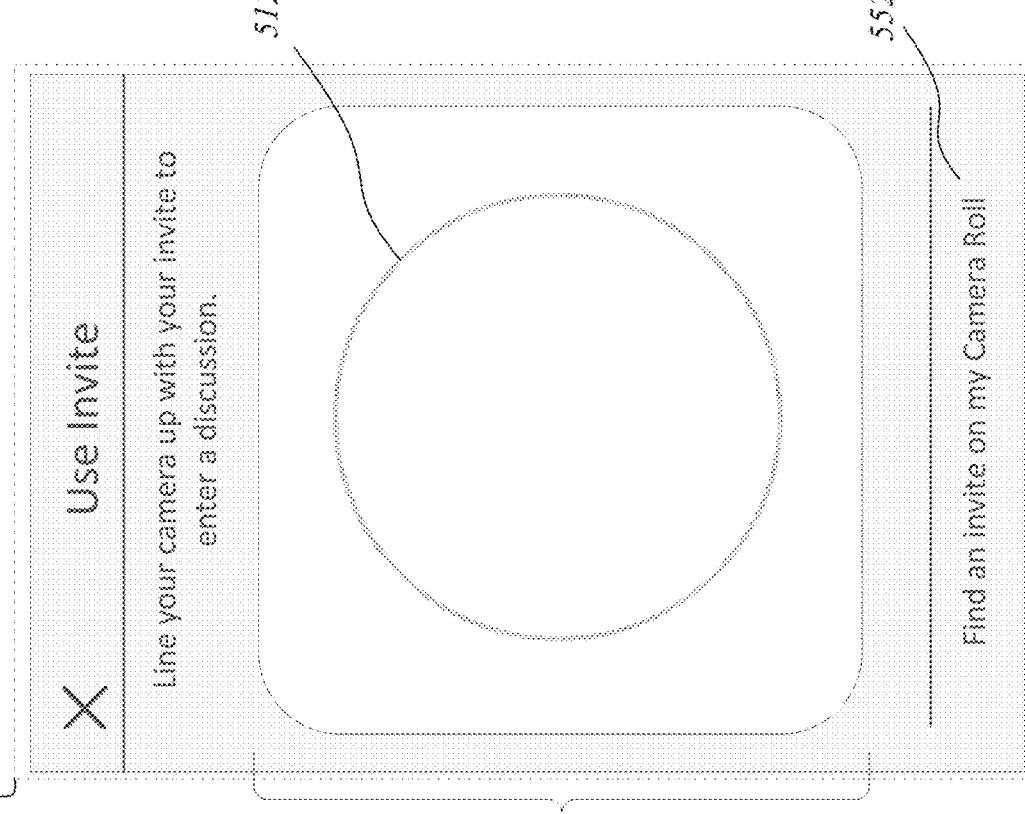
FIG. 5A-5B illustrate exemplary embodiments of an image capture UI views.
Figure 5A:
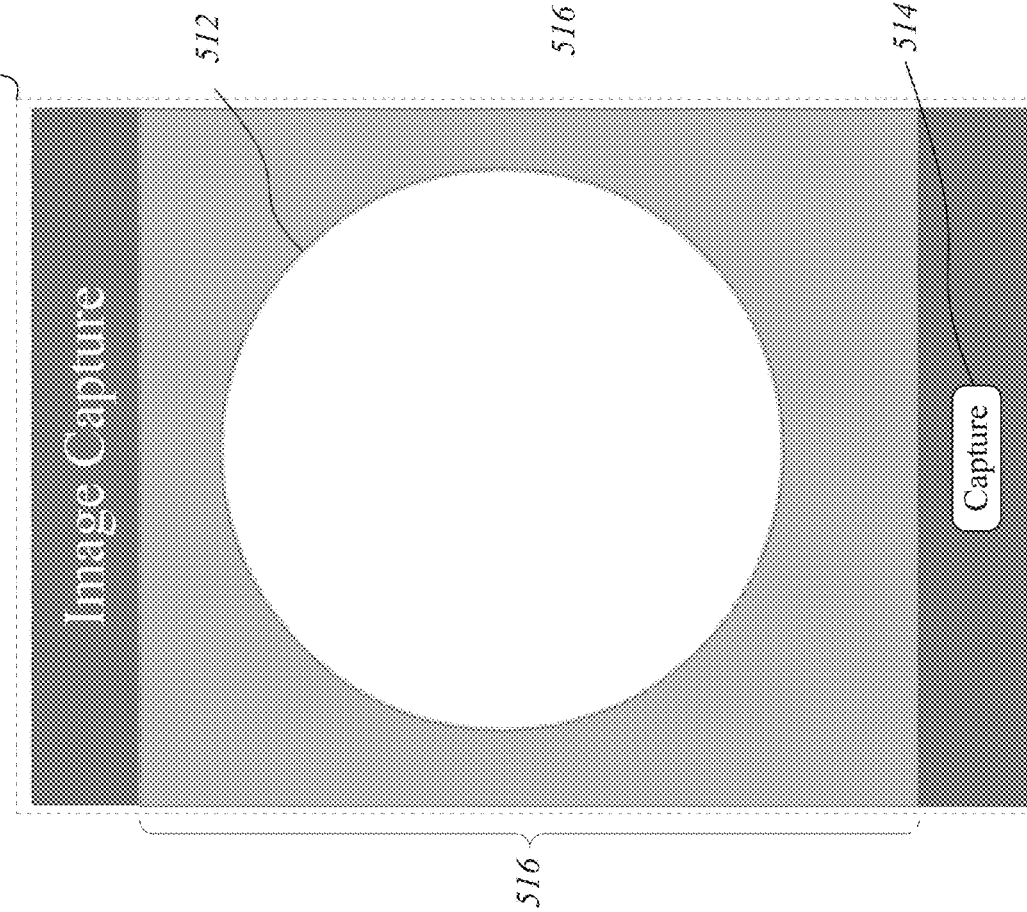

FIG. 5A-5B illustrate exemplary embodiments of image capture UI views 500 and 550. As illustrated in image capture UI views 500 and 550 of FIG. 5A-5B, the discussions rendering component 190-2 may be configured to render the image capture UI view 500 and/or 550 comprising among other UI elements, image capture live view UI element 516 configured visually present a sequence of images or video in real-time as captured by an image sensor 156 of the image capture component 154 in real-time.

The image capture UI views 500 and 550 of FIGS. 5A and 5B may further include, among other UI elements, an image capture assist UI element 512. As illustrated in the exemplary embodiment of image capture UI view 500 of FIG. 5A, the image capture assist UI element 512 may comprise a substantially similar predefined geometric shape as a machine-readable invitation signature (e.g., machine-readable invitation signature 212-1 having a circular shape of FIG. 2A, etc.), so that a user may align at least the machine-readable invitation signature viewable in the physical world (e.g., a discussions invitation ticket on a printed medium such as a poster, a discussions invitation ticket visually presented on a display screen, etc.) with the image capture assist UI element 512 of FIG. 5A visually presented on the touch sensitive display screen 310.

As illustrated in the exemplary embodiment of image capture UI view 550 of FIG. 5B, the image capture live view UI element 516 and the image capture assist UI element 512 of FIG. 5B may comprise a substantially similar predefined geometric shape as a machine-readable invitation signature and/or machine-readable invitation token (e.g., machine readable invitation token 214-2, 214-3 of FIG. 2B-2C, etc.) of a discussions invitation ticket for a forum or a group, so that a user may align a machine-readable invitation signature and/or machine-readable invitation token viewable in the physical world with the image capture live view UI element 516 and/or image capture assist UI element 512 visually presented on the touch sensitive display screen 310.

To further assist the user in aligning the machine-readable invitation signature with the image capture assist UI element 512, in some embodiments such as the exemplary embodiment of image capture UI view 500 of FIG. 5A, the image capture live view UI element 516 of FIG. 5A may be visually presented as a dimmer, darker, distorted, and/or otherwise semi-transparent region while the region within the image capture assist UI element 512 may be lighter, clearer, and/or fully transparent, so that the user may clearly view and align at least the machine-readable invitation signature with the region in the image capture assist UI element 512.

In the exemplary embodiment of FIG. 5A, The image capture UI view 500 may further include, among other UI elements, a selectable capture UI element 514, where the user of the mobile discussions application 124-1-1 may select the selectable capture UI element 514 using a selection finger gesture to request the discussions imaging component 190-3 to capture at least the image information contained in the image capture assist UI element 512, and store the captured image, which may include, but is not limited to, the discussions invitation ticket and/or a machine-readable invitation token in an image datastore (e.g., image datastore 220 of FIG. 2D).Once captured, the discussions imaging component 190-3 and/or discussions token component 190-6 may automatically scan the image datastore to recognize the discussions invitation ticket and/or the machine-readable invitation token within the discussion invitation ticket in the newly captured image.

To further assist the user in the recognition of the discussions invitation ticket and/or machine-readable invitation token, in some embodiments such as the exemplary embodiment of image capture UI view 550 of FIG. 5B, the discussions imaging component 190-3 and/or the discussions token component 190-6 may be configured to automatically recognize a discussions invitation ticket and/or a machine-readable invitation token within the discussions invitation ticket, in real-time, when the discussions invitation ticket (e.g., discussions invitation ticket 230-2 of FIG. 2B, discussions invitation ticket 230-3 of FIG. 2C, etc.), and in particular, the machine-readable invitation signature (e.g., machine-readable invitation signature 212-2, machine-readable invitation signature 212-3, etc.) and/or machine-readable invitation token (e.g., machine-readable invitation token 214-2, machine-readable invitation token 214-3, etc.) is/are substantially aligned with the image capture live view UI element 516 and/or image capture assist UI element 512 of FIG. 5B.

In the exemplary embodiment of FIG. 5B, the image capture UI view 550 may further include, a selectable browse image UI element 552 to visually present one or more UI elements and/or UI views (not shown) to enable the user to select one or more image stored in the image datastore 220 for recognition of one or more discussions invitation tickets (e.g., discussions invitation ticket 230-1, 230-2, 230-3, etc.), in response to user selecting the selectable browse image UI element 552 in order to provide access to the one or more forums or one or more groups associated with the one or more discussions invitation tickets.

In the exemplary embodiments of FIG. 5A-5B, after recognizing the discussions invitation ticket and/or the machine-readable invitation token, the discussions managing component 190-1 may automatically enable the user access to a social forum or a social group associated with the recognized discussions invitation ticket and/or machine-readable invitation token by automatically adding a selectable discussion UI element (e.g., selectable discussion UI element 312-2 in the discussions UI view 300 of FIG. 3B or selectable discussion UI element 352-2 in the discussions UI view 350 of FIG. 3D) representative of the social forum or the social group in the discussions UI view. Optionally, in some embodiments, the discussions managing component 190-1 may also automatically join the user as a forum member of the social forum or a group member of the social group having the associated user account and user profile, after automatically recognizing the discussions invitation ticket and/or the machine-readable invitation token. Optionally, in addition to the automatic joining of the social forum or social group, the discussions managing component 190-1, in some embodiments, may further request and receive at least a portion of the social forum information or social group information for the newly accessible social forum or social group from the social networking system 101, and configure to the discussions rendering component 190-2 to transition to the discussion UI view (e.g., discussion UI view 400 of FIG. 4A or discussion UI view 450 of FIG. 4B) for the newly accessible social group and/or social forum, so that at least a portion of the social forum information or social group information may be visually presented to the user.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

Figure 6:
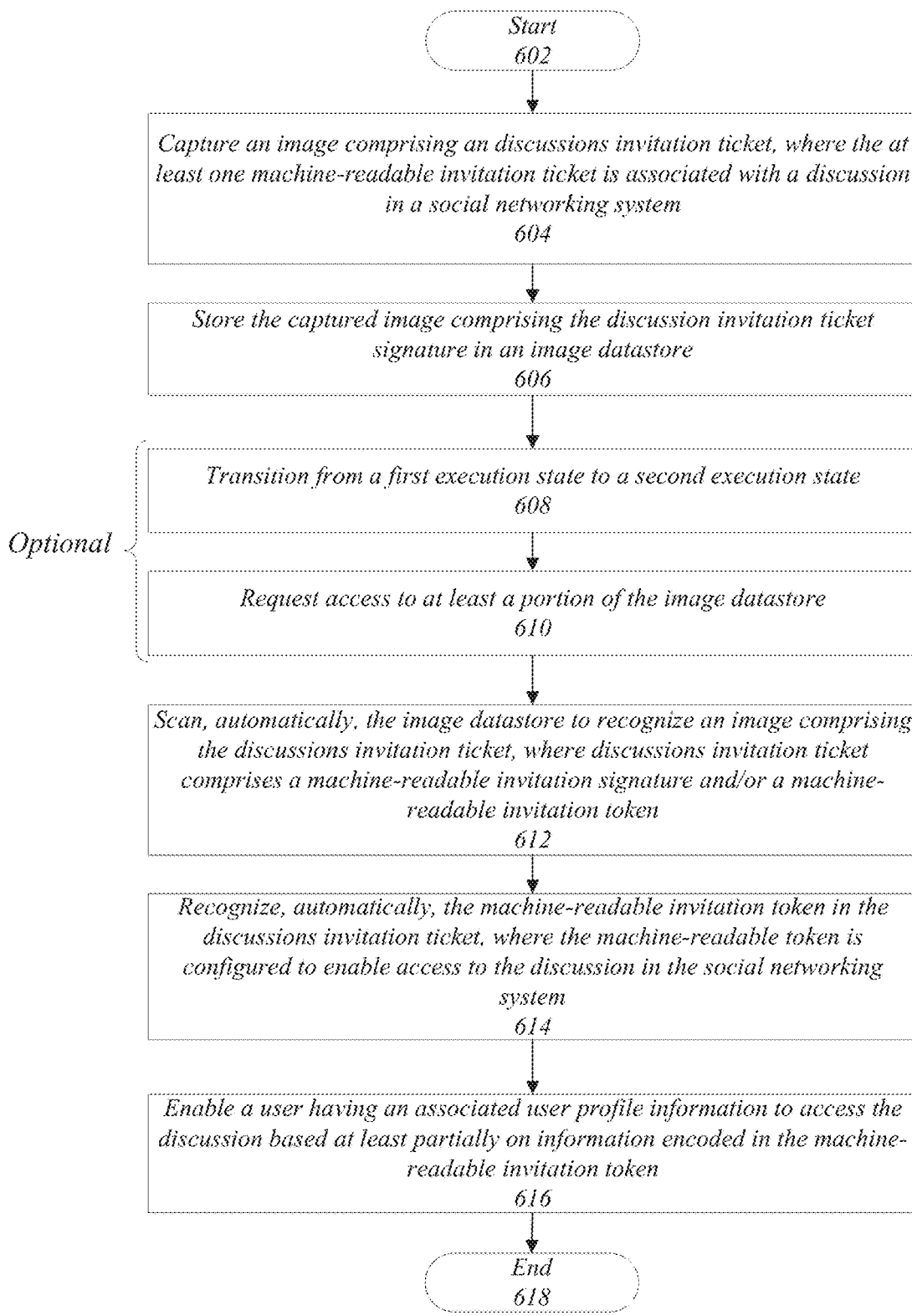
FIG. 6 illustrates an exemplary embodiment of a logic flow for accessing and/or joining a discussion.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may start at block 602 and may capture an image comprising a discussions invitation ticket, where the discussions invitation ticket is associated with a discussion in a social networking system at step 604. For example, the discussions imaging component 190-3 may capture an image such as image 210-1 utilizing the image capture component 154 of mobile device 102-1, where the captured image 210-1 may include, but is not limited to, a discussions invitation ticket 230-1 to enable a user having an associated user account and user profile access to a discussion (e.g., a social forum or a social group) associated with the discussions invitation ticket such as the forum having the forum name 216-1 "Greek Art." Additionally or alternatively, a non-mobile discussions application (e.g., operating system 122 and/or management application 124-1-2, etc.) may capture an image such as image 210-1 which may include, but is not limited to, the discussions invitation ticket 230-1, where the discussions invitation ticket 230-1 may further include, but is not limited to, the machine-readable invitation signature 212-1 and/or the machine-readable invitation token 214-1.

The logic flow 600 may store the captured image comprising the discussions invitation ticket in an image datastore at step 606. For example, the discussions imaging component 190-3 may store the captured image comprising a discussions invitation ticket as image information 222 in the image datastore 220. Additionally or alternatively, a non-mobile discussions application (e.g., operating system 122-1 and/or management application 124-1-2 capturing a "screenshot" of a social application 124-1-9 comprising the discussions invitation ticket, etc.) may store the captured image 210-1 comprising discussions invitation ticket 230-1 in the image datastore 220 as image information 222.

The logic flow 600 may transition from a first execution state to a second execution state at 608. For example, the mobile discussions application 124-1-1, may optionally, transition from a non-foreground state (e.g., non-execution state, etc.) to a foreground state, when a non-mobile discussions application captures and stores an image 210-1 comprising a discussions invitation ticket 230-1 and the user requests to launch the mobile discussions application 124-1-1. It may be appreciated that when the image 210-1 comprising the discussion invitation ticket 230-1 is captured by the mobile discussions application 124-1-1, then the mobile discussions application 124-1-1 may not transition between any execution states and may instead, automatically, begin scanning the image datastore 220 in order to recognize one or more images 210-f comprising discussions invitation tickets.

The logic flow 600 may request access to at least a portion of the image datastore at 610. For example, the mobile discussions application 124-1-1, may optionally, if not already, request access (read, write, modify, and/or remove, etc.) to one or more images representative of image information 222 stored in image datastore 220 utilizing a modal access request dialog UI element (not shown) visually presented on a touch sensitive display screen 310. It may appreciated that when the image 210-1 comprising the discussion invitation ticket 230-1 is captured by the mobile discussions application 124-1-1 or when the image datastore access information indicates that the user has already allowed the mobile discussions application 124-1-1 access to image datastore 220, then mobile discussions application 124-1-1 may not request access to the image datastore 220 because access to the image datastore 220 has been previously granted.

The logic flow 600 may scan, automatically, the image datastore to recognize an image comprising the discussions invitation ticket, where the discussions invitation ticket comprises a machine-readable invitation signature and/or a machine-readable invitation token at 612. For example, the mobile discussions application 124-1-1 may scan one or more images to recognize an image comprising the discussions invitation ticket 230-1, where the discussions invitations ticket may include, but is not limited to, a machine-readable invitation signature 212-1 and/or machine-readable invitation token 214-1. The machine-readable invitation signature 212-1 may further include one or more machine-readable signature features (e.g., predefined geometric shape, predefined size, predefined border thickness, predefined range of colors, etc.) specific for a plurality of forums and/or a plurality of groups. Additionally, the mobile discussions application 124-1-1 may scan, automatically, the image datastore 220 to recognize an image comprising the discussions invitation ticket 230-1, in response to the mobile discussions application transitioning from a non-foreground state to a foreground state.

The logic flow 600 may recognize, automatically, the machine-readable invitation token in the discussions invitation ticket, where the machine-readable invitation token is configured to enable access to the discussion in the social networking system at 1414. For example, the mobile discussions application 124-1-1 may recognize, automatically, the machine-readable invitation token 214-1 in the discussions invitation ticket 230-1. Additionally, the machine-readable invitation token 214-1 may comprise an optical machine-readable invitation token 214-1 such as, for example a QR code.

The logic flow 600 may enable a user having an associated user profile to access the discussion based at least partially on information encoded in the machine-readable invitation token at 616 and may end at 618. For example, the mobile discussions application 124-1-1 may enable a user having an associated user profile to access the forum having the forum name 216-1 "Greek Art" based at least partially on a discussions invitation token encoded within the optical machine-readable invitation token 214-1. Moreover, the mobile discussions application 124-1-1 may enable the user access by adding a selectable discussion UI element 312-2 representative of the forum having the forum name 216-1 "Greek Art" to the discussions UI view 300. The mobile discussions application 124-1-1 may further enable the user access by automatically joining the user as a forum member in the forum having the forum name 216-1 "Greek Art." The mobile discussions application 124-1-1 may still further enable the user access by automatically transitioning from the discussions UI view 300 to the discussion UI view 400 for the forum having the forum name 216-1 "Greek Art," and visually presenting at least a portion of the social forum information associated with the forum having the forum name 216-1 "Greek Art."

Figure 7:
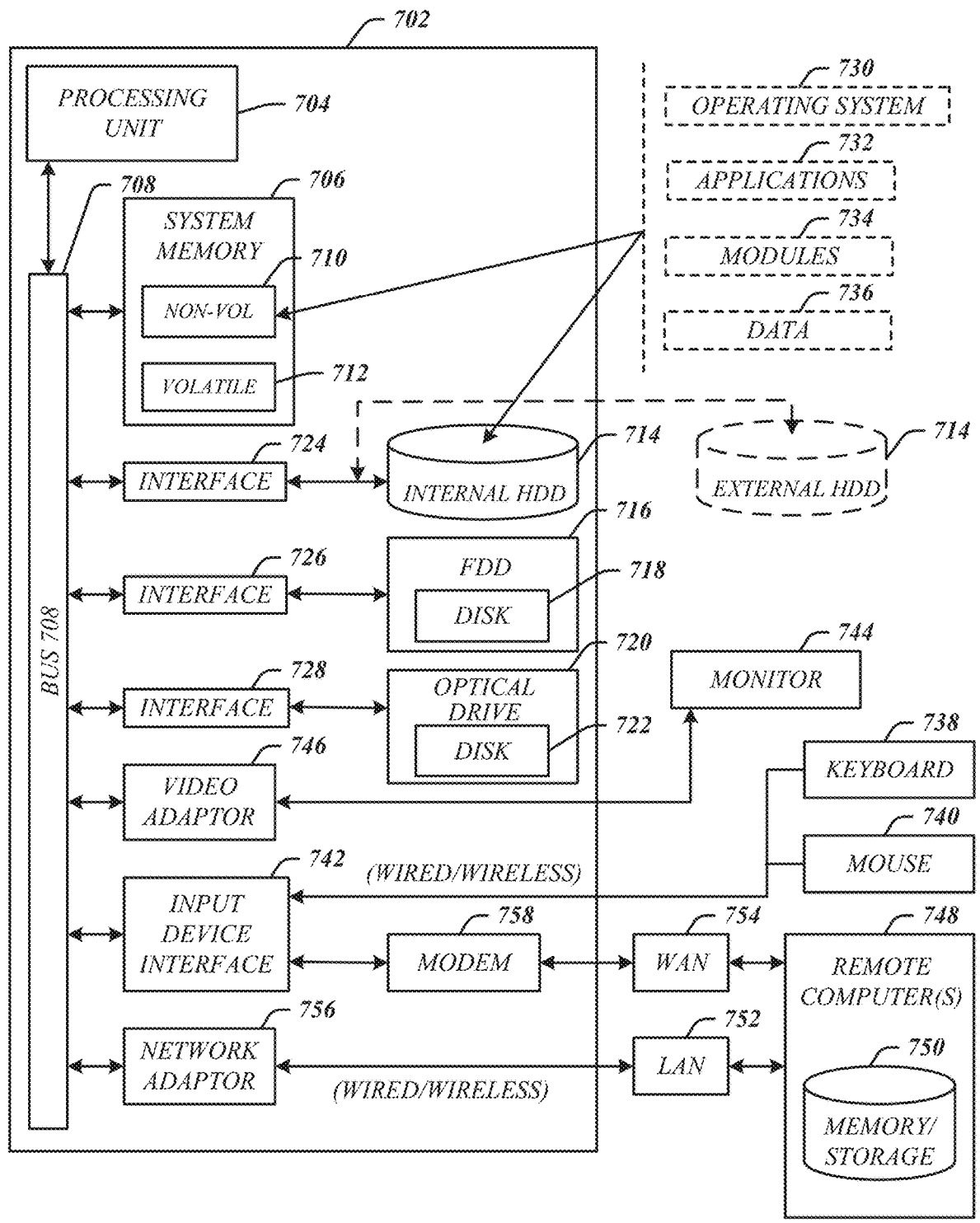
FIG. 7 illustrates an exemplary embodiment of a computing architecture.

FIG. 7 illustrates an embodiment of an exemplary computing architecture 700 suitable for implementing various embodiments as previously described, such as, for example server device 106 and/or one or more devices 102-a. In one embodiment, the computing architecture 700 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms 'first,' "second," 'third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
   retrieving an image from a user of a social networking system, the user having an associated user account and user profile on the social networking system, the image containing a discussions invitation ticket comprising a machine-readable invitation token configured to provide the user having the associated user account and user profile access to one or more discussion groups associated with the machine-readable invitation token;
   recognizing the machine-readable invitation token in the image;
   decoding the machine-readable invitation token; and
   providing access to the user to the one or more discussion forums based on the decoding of the machine-readable invitation token.

2. The computer implemented method of claim 1, wherein retrieving the image further comprises:

scanning, automatically, an image datastore on a mobile device associated with the user to recognize at least one image comprising the discussions invitation ticket.

3. The computer implemented method of claim 1, wherein the invitation ticket further comprises an invitation signature comprising a geometric shape, substantially enclosing at least the invitation token.

4. The computer-implemented method of claim 1, further comprising:
capturing an image, the captured image comprising the discussions invitation ticket; and
storing the captured image in an image datastore on a mobile device associated with the user.

5. The computer-implemented method of claim 1, further comprising:
rendering a ticket image comprising a token configured to authorize access to a discussion forums or groups to a second user in the social networking system having an associated user account and user profile; and
providing the ticket image to a different mobile device associated with the second user to enable access to the discussion forums or groups by the second user.

6. At least one non-transitory computer-readable storage medium comprising instructions that, when executed, cause a system to:
retrieve an image from a user of a social networking system, the user having an associated user account and user profile on the social networking system, the image containing a discussions invitation ticket comprising a machine-readable invitation token configured to provide the user having the associated user account and user profile access to one or more discussion groups associated with the machine-readable invitation token;
recognize the machine-readable invitation token in the image;
decode the machine-readable invitation token; and
provide access to the user to the one or more discussion forums based on the decoding of the machine-readable invitation token.

7. The non-transitory computer-readable storage medium of claim 6, wherein the instructions to retrieve the image, when executed, further cause the system to:
scan, automatically, the image datastore on a mobile device associated with the user to recognize at least one image comprising the discussions invitation ticket.

8. The non-transitory computer-readable storage medium of claim 6, wherein the instructions, when executed, further cause the system to:
capture an image, the captured image comprising the discussions invitation ticket; and
store the captured image in an image datastore on a mobile device associated with the user.

9. The non-transitory computer-readable storage medium of claim 6, wherein the instructions, when executed, further cause the system to:
render a ticket image comprising a token configured to enable access to a discussion forum or group to a second user in the social networking system having an associated user account and user profile; and
provide the ticket image to a different mobile device associated with the second user to enable access to the discussion forum or group by the second user.

10. An apparatus, comprising:
a processor circuit;
memory operatively coupled to the processor circuit, the memory to store a mobile discussions application for execution by the processor circuit, the mobile discussions application configured to:
retrieve an image from a user of a social networking system, the user having an associated user account and user profile on the social networking system, the image containing a discussions invitation ticket comprising:
a machine-readable invitation token configured to provide the user having the associated user account and user profile access to one or more discussion groups associated with the machine-readable invitation token; and
an invitation signature comprising a geometric shape enclosing the machine-readable invitation token;
recognize the machine-readable invitation token in the image;
decode the machine-readable invitation token; and
provide access to the user to the one or more discussion forums based on the decoding of the machine-readable invitation token.

11. The apparatus of claim 10, wherein the discussions invitation ticket is recognized in at least one image in an image datastore on a mobile device associated with the user.

12. The apparatus of claim 11, wherein retrieving the image comprises scanning, automatically, the image datastore to recognize at least one image comprising the discussions invitation ticket.

13. The apparatus of claim 12, wherein the mobile discussions application is further configured to scan, automatically, the image datastore to identify at least one image comprising a discussions invitation ticket, in response to a transition of an execution state associated with the mobile discussions application from a non-foreground state to a foreground state.

14. The apparatus of claim 11, wherein the at least one image comprises at least one discussions invitation ticket, and the at least one image is captured and stored in an image datastore on the mobile device by a non-mobile discussions application.

15. The apparatus of claim 11, the mobile discussions application further configured to invite a different user having an associated user account and user profile on a different mobile device to access a particular discussion forum or group in the social networking system based at least partially on an image comprising an invitation token configured to enable access to the particular discussion forum or group.

* * * * *